United States Patent [19]
Ise et al.

[11] Patent Number: 5,442,621
[45] Date of Patent: Aug. 15, 1995

[54] ISDN SWITCHING SYSTEM HAVING TESTING FACILITIES

[75] Inventors: Noboru Ise; Kenji Tsutsumi; Ryoji Shimozono; Aya Takagi, all of Kawasaki; Hiroyuki Kudoh, Fukuoka; Hiroshi Adachi, Fukuoka; Yoshihiro Shimizu, Fukuoka; Kunio Yamamoto, Kawasaki, all of Japan

[73] Assignee: Fujitsu Limited, Kanagawa, Japan

[21] Appl. No.: 981,557

[22] Filed: Nov. 25, 1992

[30] Foreign Application Priority Data

Nov. 27, 1991 [JP] Japan ................................. 3-312309
Jan. 20, 1992 [JP] Japan ................................. 4-007032

[51] Int. Cl.⁶ ............................................. H04L 1/14
[52] U.S. Cl. ................................. 370/15; 370/110.1; 371/20.5
[58] Field of Search ................ 370/13, 14, 15, 17, 370/58.1, 58.2, 110.1; 371/20.1, 20.4, 20.5, 68.2; 379/5, 27, 28, 29

[56] References Cited

U.S. PATENT DOCUMENTS

| | | | |
|---|---|---|---|
| 4,965,795 | 10/1990 | Coffelt et al. | 370/13 X |
| 4,998,240 | 3/1991 | Williams | 370/17 |
| 5,027,343 | 6/1991 | Chan et al. | 370/17 |
| 5,187,705 | 2/1993 | Mano | 370/15 |

FOREIGN PATENT DOCUMENTS 62-294364 12/1987 Japan.
4-113755 4/1992 Japan.

*Primary Examiner*—Melvin Marcelo

[57] ABSTRACT

An ISDN switching system having facilities for testing an ISDN signal composed of B-channels and D-channels at least. The testing facilities can achieve a B-channel test and D-channel test selectively with simple construction by employing a converting unit in the system. The converting unit enables creation of a connection path between a test equipment and an object to be tested through an ISDN exchange and thus the ISDN signals for the test can be treated as usual ISDN signals. Thereby, the test equipment and the object can freely be connected to each other.

20 Claims, 20 Drawing Sheets

ISDN SWITCHING SYSTEM HAVING TESTING FACILITIES

BACKGROUND OF THE INVENTION

1. Field of the Invention

The present invention relates to an Integrated Services Digital Network (ISDN) switching system which incorporates therein testing facilities for ISDN signals.

ISDN has been internationally standardized for integrally supporting worldwide communications for a variety of media services such as speech signals, computer data signals, picture signals and so on.

Along with the progress of ISDN, it is also required to improve reliability in communications, and therefor, testing facilities for B-channel signals and D-channel signals must be incorporated in the ISDN switching system.

2. Description of the Related Art

As will be explained in detail hereinafter, conventional testing facilities involve some problems.

In short, regarding the D-channel test, it is very difficult to achieve a monitoring test and a bit error measurement for the D-channel signals per se. This is because, the D-channel signals are terminated at a Link Access Procedure on the D-channel (LAPD) termination unit in each Digital subscriber Line Circuit Controller (DLCC). Therefore, if a test for the D-channel signal per se is required, the test facilities must prepare a great number of testing cables to be connected to the input/output terminals of each LAPD.

Regarding the B-channel test, known as a Bridge Cut-Off (BCO) test, the following problems have arisen.

i) Many sets of test use ISDN terminal equipment are needed, since many sets of Digital subscriber Line & Trunk test Equipment (DLTE) are used for each ISDN exchange which is coupled with the corresponding test use ISDN terminal equipment. Further more sets of the test use ISDN terminal equipment must be employed if the ISDN switching system is set up with a plurality of remote local switches.

ii) If the BCO test must be carried out for a subscriber accommodated in the remote local switch, usually unmanned switch, an operator must go to the remote local switch to operate the test use ISDN terminal equipment.

iii) If the BCO test is to be carried out under control of a Central Maintenance Operation Center (CMOC), test use cables must be provided for the connection between the CMOC and each local switch. This prevents an easy expansion of the BCO test.

SUMMARY OF THE INVENTION

Therefore, the present invention, in view of the above problem, has as its object the provision of an ISDN switching system having (2B+D) channel testing facilities which can achieve a simple and flexible test for the D-channel and also the B-channel of the ISDN signal.

To attain the above object, a converting means is introduced. The converting means converts the signals for the test into the form of usual ISDN signals, which enables a connection between an object to be tested and a testing means through the ISDN exchange as does the usual ISDN signal.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
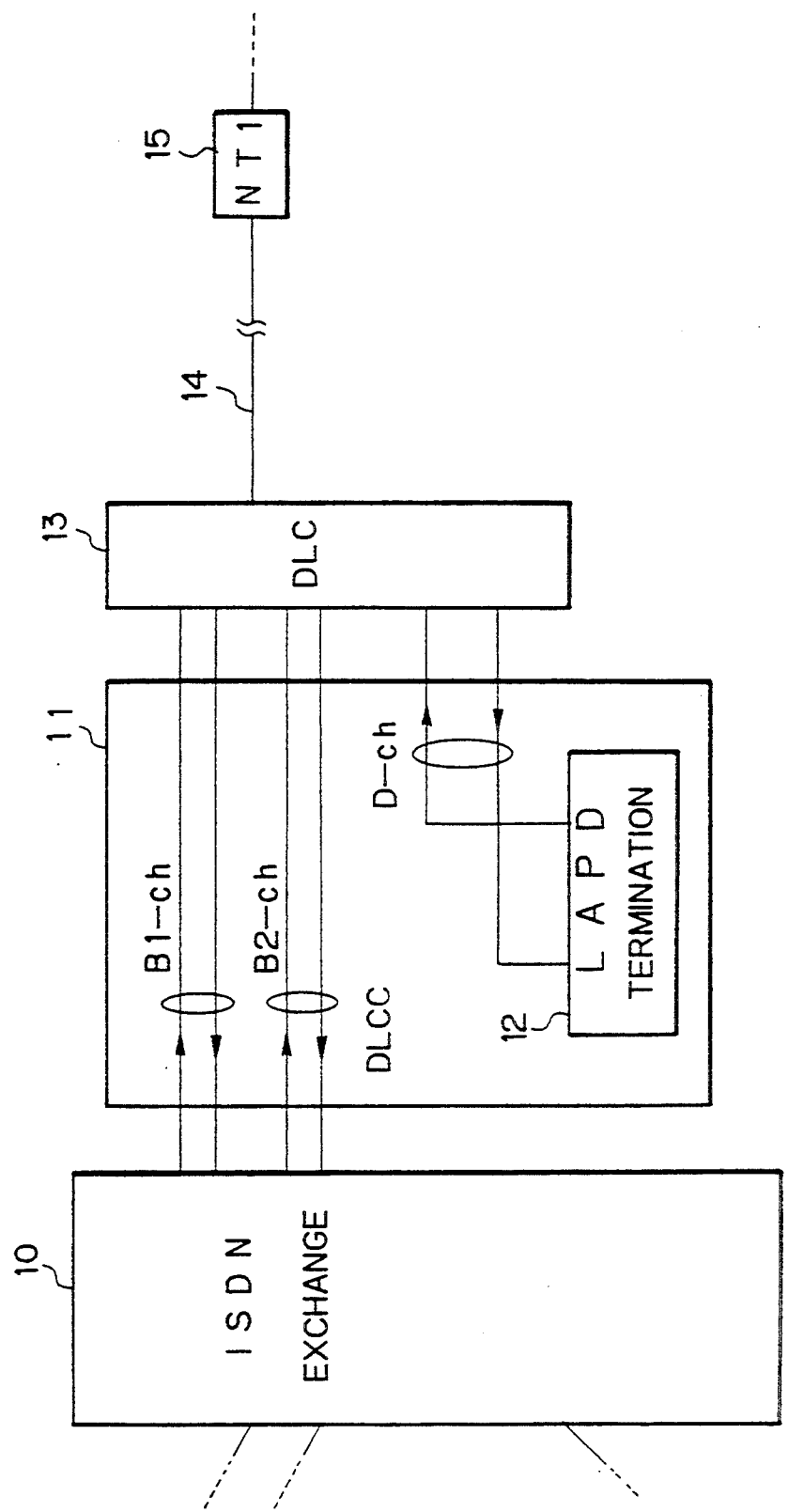
FIG. 1 is a block diagram of a prior art ISDN switching system for explaining a D-channel test.

FIG. 1 is a block diagram of a prior art ISDN switching system for explaining a D-channel test. In FIG. 1, reference numeral 10 denotes an ISDN exchange which accommodates a variety of terminal equipment such as digital telephone sets, data terminals and so on and performs an exchange of B-channel signals. Reference numeral 11 denotes a Digital subscriber Line Circuit Controller (DLCC), 12 a Link Access Procedure on the D-channel (LAPD) termination unit which terminates the D-channel operated under a protocol called "LAPD" between the unit 12 and the subscriber terminal equipment, 13 a Digital subscriber Line Circuit (DLC), 14 a digital subscriber line and 15 a Network Termination (NT1).

The subscriber terminal equipment (not shown) is connected to the ISDN exchange 10 via the NT1(15), the digital subscriber line 14, the DLC 13 and the DLCC 11. A two-way communication is performed on the digital subscriber line 14 between the NT1(15) and the DLC 13, using a Time Compression Modulation (TCM) method, called a ping pong method, or an echo cancellation method. Using the above method, a multiplex transmission of the ISDN signal is carried out, in which the ISDN signal is composed of, as a basic interface, two B-channels (2B) for transmission of inherent information signals at 64 kbps and one D-channel (D) for transmission of control signals or packets at 16 Kbps, thus forming a so-called 2B+D channel structure. Incidentally, as a primary rate interface, a multiplex transmission is carried out with a channel structure of 23B+D and so on.

For the ISDN, the CCITT proposes a recommendation of interfaces. For example, layers 1 to 3 as a user network interface, called an I interface, is regulated. Each country defines its own standard in accordance with the I interface. Under the I interface, control signals for a call origination, a call destination and control signals generated in a call are transmitted by using the D-channel according to the protocol of LAPD. At the ISDN exchange side, the D-channel signal is terminated by the LAPD termination unit 12 in the DLCC 11. The thus terminated D-channel signal is given to a control unit, such as a call processor, of the ISDN exchange and the ISDN exchange is controlled by a command contained in the D-channel signal.

Thus, it is difficult to achieve the aforesaid monitoring test and the aforesaid bit error measurement, as the BCO test, with respect to the D-channel signals per se, since all the D-channel signals are terminated at the LAPD termination unit 12. This is the aforementioned problem raised in the test of the D-channel.

Figure 2:
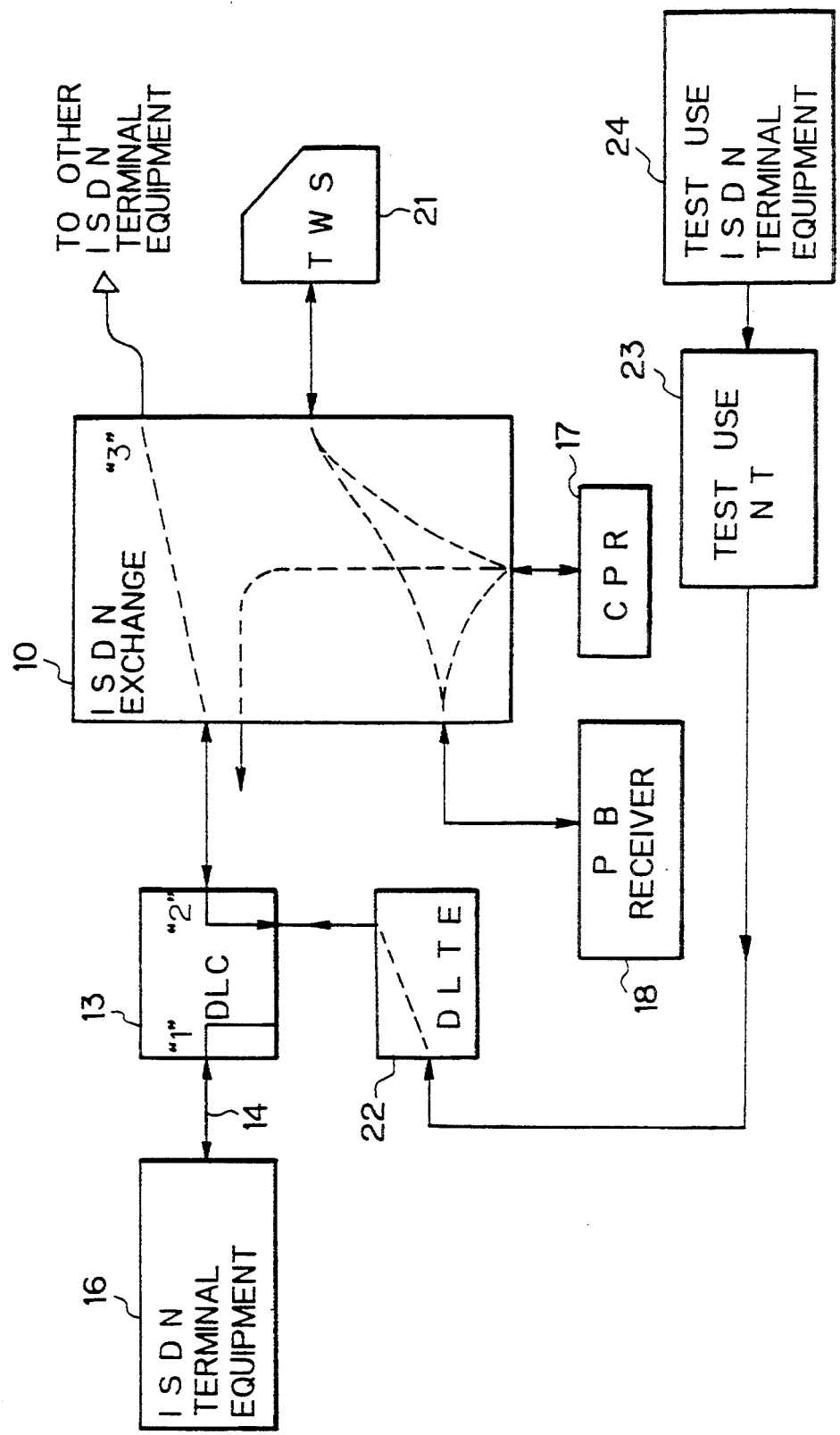
FIG. 2 is a block diagram of a prior art ISDN switching system of a first type for explaining a B-channel test.
Figure 3:
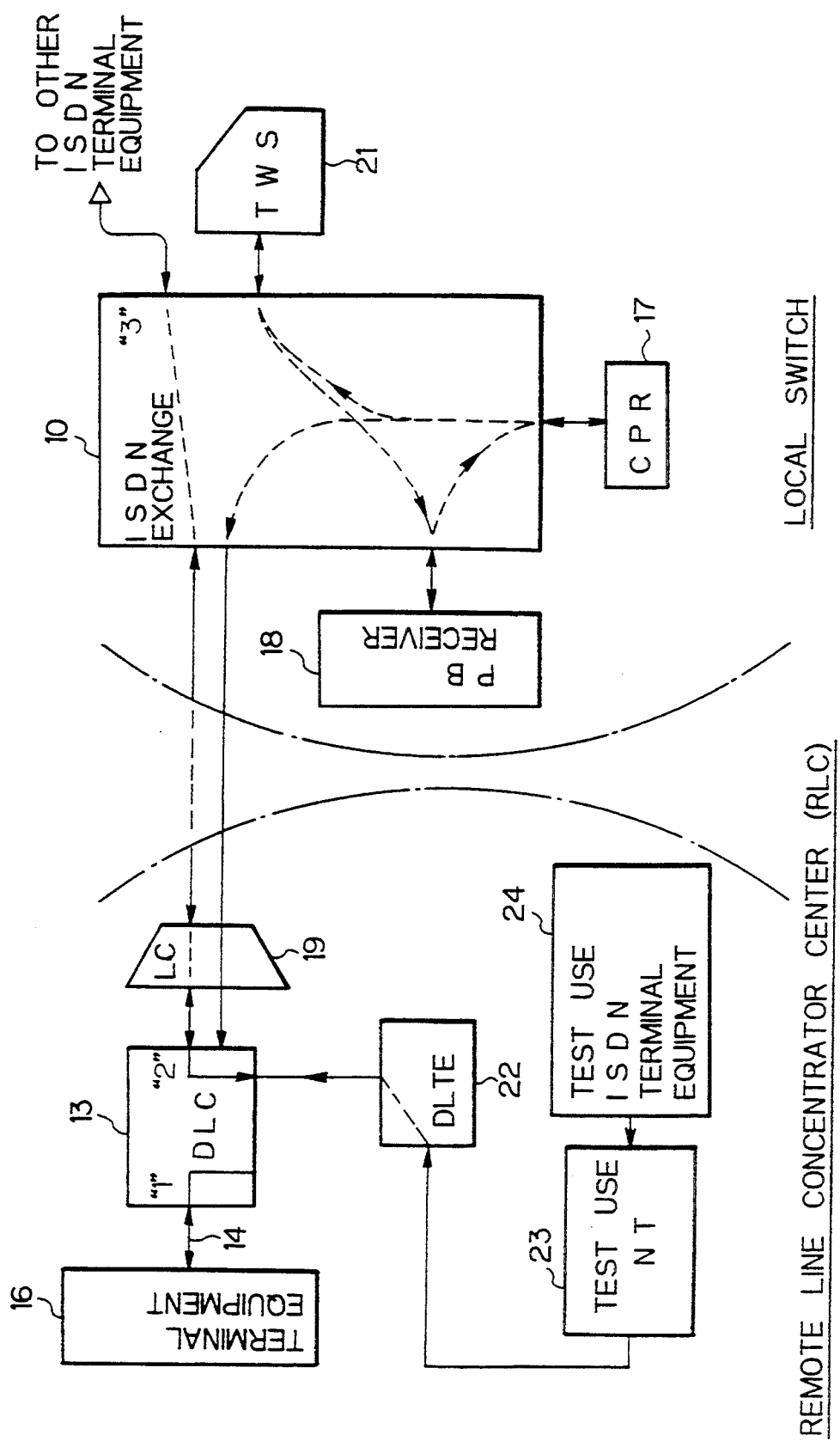
FIG. 3 is a block diagram of a prior art ISDN switching system of a second type for explaining the B-channel test.
Figure 4:
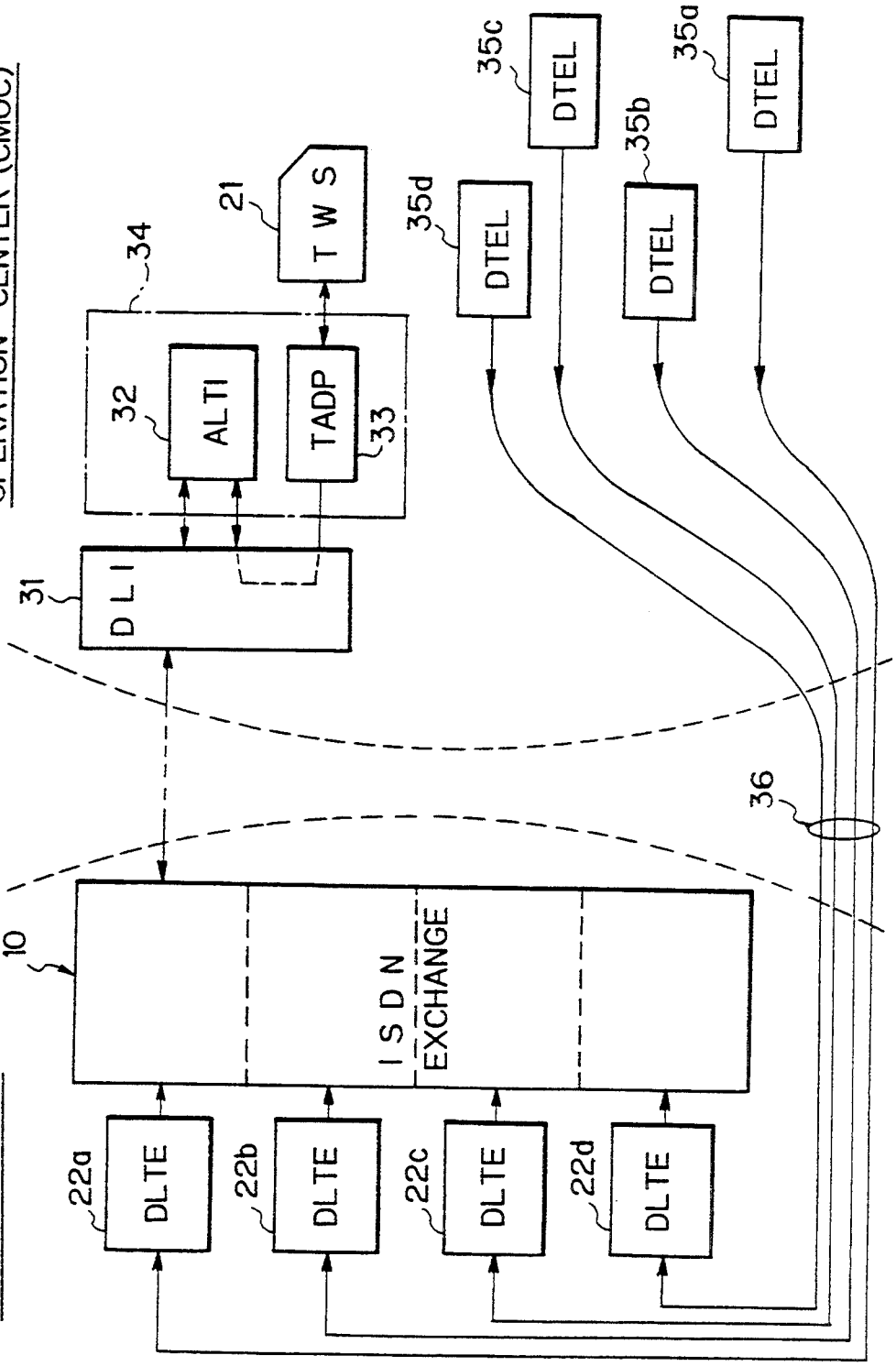
FIG. 4 is a block diagram of an ISDN switching system of a third type for explaining the B-channel test.

FIG. 2 is a block diagram of a prior art ISDN switching system of a first type for explaining a B-channel test, FIG. 3 is a block diagram of a prior art ISDN switching system of a second type for explaining the B-channel test, and FIG. 4 is a block diagram of an ISDN switching system of a third type for explaining the B-channel test. To be specific, FIG. 2 represents a case where an object to be tested is accommodated in a usual local switch. FIG. 3 represents a case where the BCO test is achieved with respect to an object which is accommodated in a remote Line Concentrator Center (RLC). FIG. 4 represents a case where the BCO test is achieved by a Central Maintenance Operation Center (CMOC). In FIG. 2, members identical to those shown in FIG. 1 are represented by the same reference numerals or symbols. This also applies to the remaining figures.

Referring to FIGS. 2 and 3, reference numeral 16 denotes the ISDN terminal equipment, such as digital telephone sets (DTEL), date terminals, G4 facsimile terminals (G4FAX) and so on. The aforesaid Digital subscriber Line Circuit (DLC) 13 works as an interface for a digital network between each subscriber and the ISDN exchange 10.

Reference numeral 21 denotes a Test Work Station (TWS) which outputs signals such as the subscriber telephone number of an object to be tested in a form of a push button (PB) signal, a command to indicate the status of the Digital subscriber Line Circuit (DLC) 11, or a command to execute the test sequentially. Reference numeral 18 denotes a Push Button (PB) receiver which receives a command issued by the TWS 21 in the form of the PB signal and translates the same into codes recognizable to a Call Processor (CPR) 17 which cooperates with the ISDN exchange 10. For example, the CPR 17 performs path connections in the ISDN exchange 10, control of the Digital subscriber Line Circuit (DLC) 11, and indication of plural sets of subscriber information at the Test Work Station (TWS) 21.

Reference numeral 22 denotes the Digital Line & Trunk test Equipment (DLTE) which executes a test for the DLC 13, and a test for the digital subscriber line 14.

Reference numeral 23 denotes a test use Network Termination (NT) which works as an interface for the end terminal of the network.

Reference numeral 19 in FIG. 3 denotes a Line Concentrator (LC) which concentrates a plurality of subscribers to connect with the ISDN exchange 10.

Referring to FIG. 2, communication between the usual ISDN terminal equipment 16 and other ISDN terminal equipment (for testing) is carried out along the network path, i.e., ISDN terminal equipment 16 → a portion "1" in the DLC 13 → a portion "2" in the DLC 13 → a portion "3" in the ISDN exchange 10.

Assuming here that a fault occurs in the network and the BCO test is executed for the network formed between the Digital subscriber Line Circuit (DLC) 13 and other ISDN terminal equipment, in this case, the Test Work Station (TWS) 21 outputs the PB signal to the PB receiver 18 via the ISDN exchange 10, which PB signal indicates the object (subscriber) to be tested. The thus sent PB signal is encoded at the PB receiver 18 to become recognizable by the Call Processor (CPR) 17. Thus the CPR 17 recognizes the related code from the PB receiver 18 and then investigates whether the object (subscriber 10) to be tested is in use or not. The TWS 21 is informed of the result of the above investigation. If the result indicates that the object to be tested is not in use, the TWS 21 fixes the related subscriber telephone number. Thereafter, the Call Processor (CPR) 17 sends a control signal to the Digital subscriber Line Circuit (DLC) 13 to change over the path in the DLC 13 to connect with the Digital subscriber Line & Trunk test Equipment (DLTE) 22. Thus, a test path is formed in the network, i.e., the portion "2" in the DLC 13 → the portion "3" in the ISDN exchange 10. After completion of the test path, the BCO test is started along the path, i.e., a test use ISDN terminal equipment 24 → a test use Network Termination (NT) 23 → the Digital subscriber Line & Trunk test equipment (DLTE) 22 → the portion "2" in the DLC 13 → the portion "3" in the ISDN exchange → other ISDN terminal equipment (for testing) so that the fault occurring in the network between the portions "2" and "3" can be checked.

Referring to FIG. 3, the BCO test is achieved between a local switch (right side) and a remote Line Concentrator Center (left side). In this case, as in the case of FIG. 2, the Test Work Station (TWS) 21 issues a command to make a test path between the Digital subscriber Line circuit (DLC) 13 and the Digital subscriber Line & Trunk test Equipment (DLTE) 22, and executes the BCO test between the test use ISDN terminal equipment 24 and other ISDN terminal equipment (for testing), so that the fault occurring in the network can be examined.

If the BCO test method of FIG. 3 is directly applied to the ISDN switch system having a Central Maintenance Operation Center (CMOC), the BCO test facilities would be of a construction as shown in FIG. 4. In FIG. 4, reference numeral 34 denotes a subscriber test interface trunk which is comprised of an Analog Line test Trunk Interface (ALTI) 32 and a Terminal Adapter (TADP) 33. The ALTI 32 is an interface for an analog line and forms an analog subscriber interface unit to handle the data communicated between the Test Work Station (TWS) 21 and the CPR 17. Further, the TADP 33 is a network adapter which divides the PB data from the TWS 21 into a control channel and speech channel and sends the same to the ISDN exchange 10.

A Digital Line Interface (DLI) 31 is accommodated in the Central maintenance Operation Center (CMOC) and has switches therein to perform an interconnection of units comprising the testing facilities. The Digital subscriber Line & Trunk test Equipment (DLTE) 22a to 22d are accommodated in the local switch. It should be understood here that the Digital subscriber Line Circuits (DLC) (shown by 13 in previous figures) are omitted here for brevity. Reference numerals 35a to 35d denote Digital Telephones (DTEL) for test use which are connected to respective DLTE's 22d to 22d via cables 36.

The test facilities of FIG. 4 is an extended version of a usual BCO test, wherein the test operations for the BCO are all carried out in the CMOC. In the operations, the Test Work Station (TWS) 21 first issues a command in the form of the PB signals to make the test path, i.e., the subscriber test interface trunk 34 → the DLI 31 → the ISDN exchange 10 → DLTE 22a to 22d, so that the BCO test is carried out with the respective Digital Telephones (DTEL) 35a to 35d.

The above mentioned three types of testing facilities shown in FIGS. 2, 3 and 4 generate the aforementioned problems recited in the items i), ii) and iii).

Figure 5:
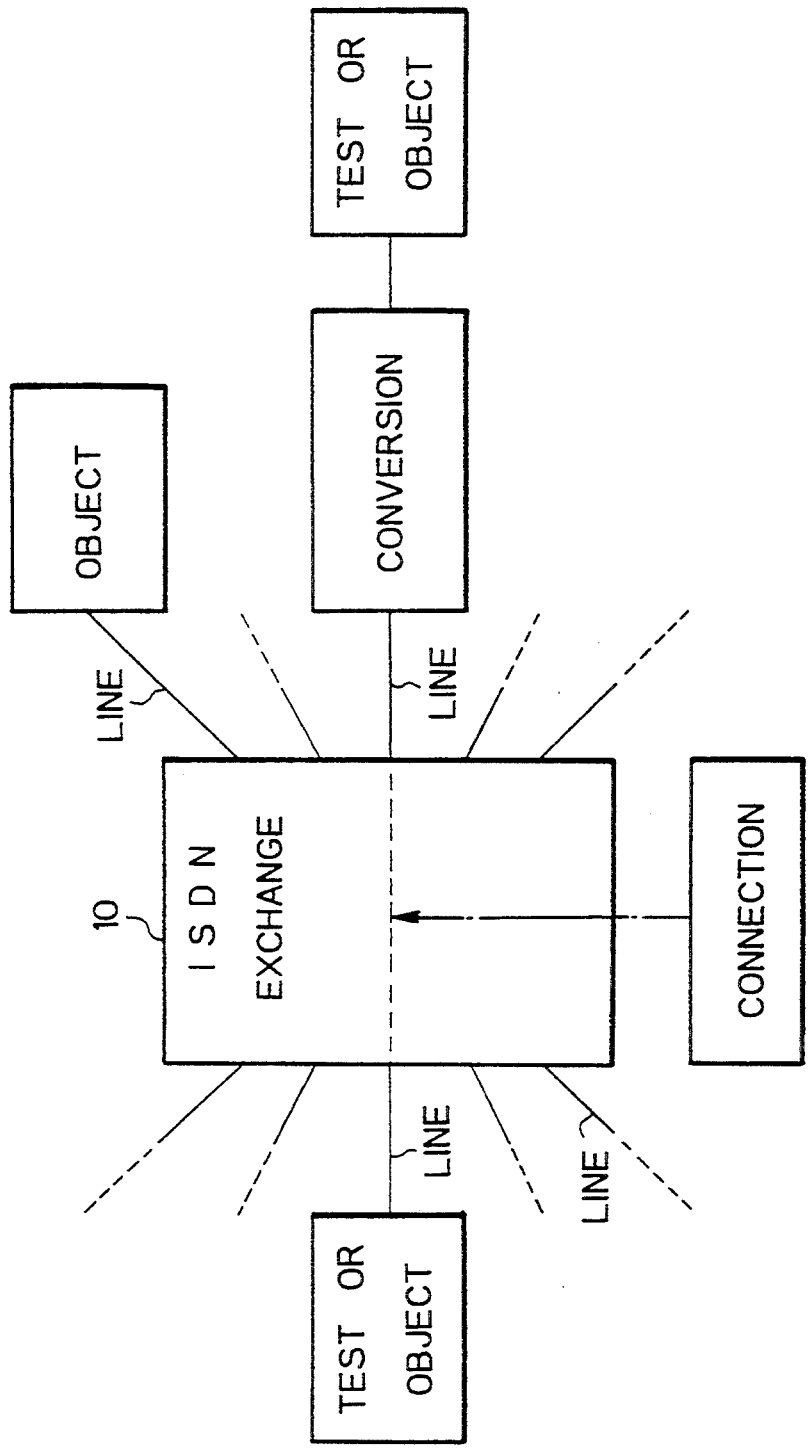
FIG. 5 is a generic view of an ISDN switching system having testing facilities according to the present invention.

FIG. 5 is a generic view of an ISDN switching system having testing facilities according to the present invention. In FIG. 5, the ISDN switching system having testing facilities is comprised of the ISDN exchange 10 accommodating a plurality of lines on which ISDN signals each composed of B-channels and D-channel at least are transferred and forming connection paths therein between the incoming line and the outgoing line; a testing means (TEST) for carrying out a test with respect to an object (OBJECT) to be tested, which object exists along the line; a converting means (CONVERSION) for directly connecting to the ISDN exchange 10 through one of the lines by performing a signal format conversion, which signal format matches the ISDN signal; and a connecting means (CONNECTION) for forming the connection path in the ISDN exchange 10 between the line connected to the converting means and the line connected to the object to be tested.

First an explanation of the D-channel test will be given below.

Figure 6:
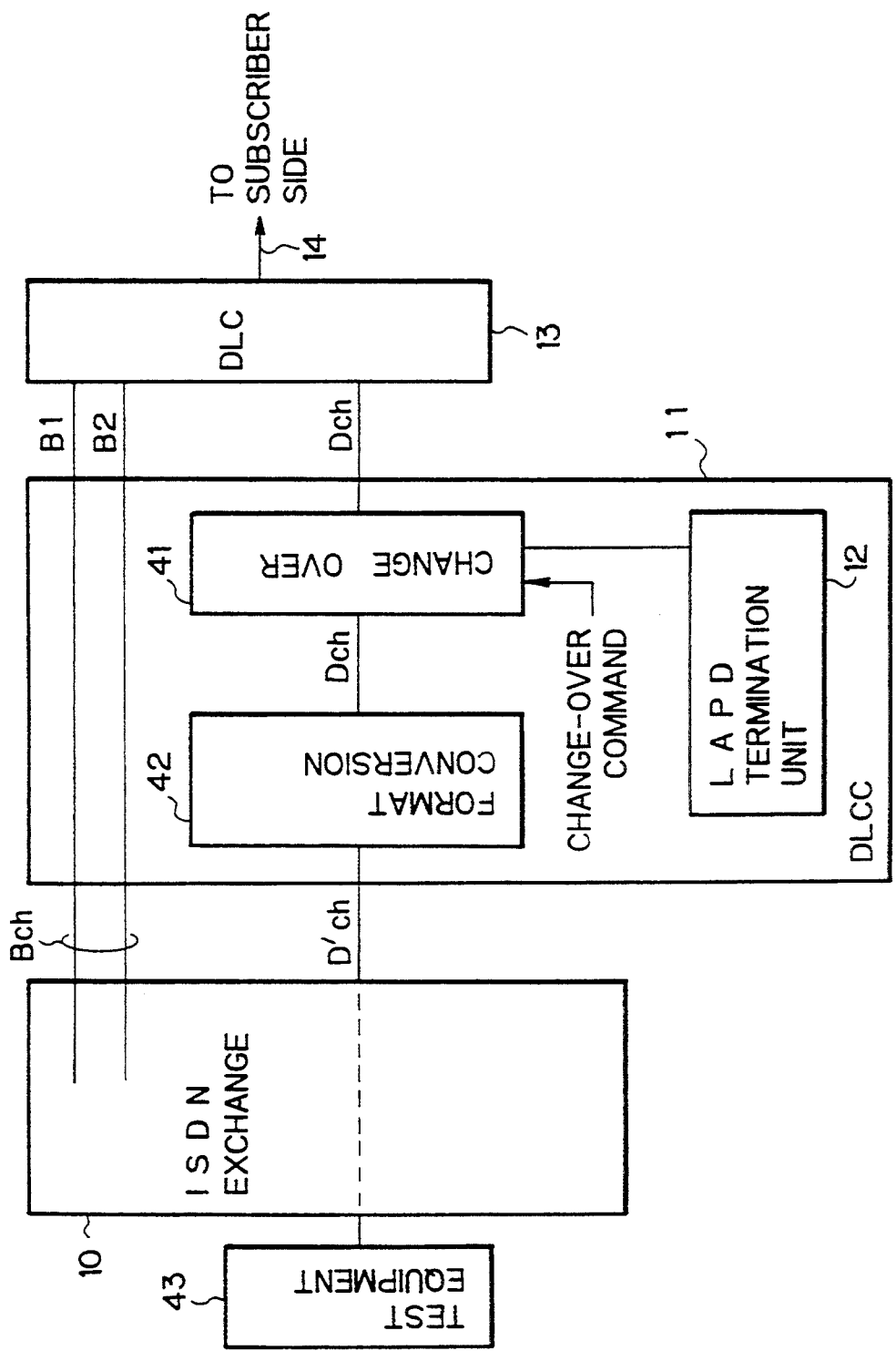
FIG. 6 illustrates a basic construction of the ISDN switching system having testing facilities for the D-channels according to the present invention.

FIG. 6 illustrates a basic construction of the ISDN switching system having testing facilities for the D-channels according to the present invention. Generally speaking, a change-over means (41) is further employed between the object to be tested and a converting means (42). The change-over means (41) is operative to apply a received D-channel signal to the converting means (42) or to the Link Access Procedure on the D-channel (LAPD) termination unit 12, selectively.

When the D-channel test is to be carried out, the change-over means (41) makes a path to apply the D-channel signal not to the LAPD termination unit 12 but to the converting means (42). The converting means (42) is operative to convert the received D-channel signal into a signal having a B-channel signal format, and the thus converted D-channel signal (D'ch) is applied to the testing means (43) through the ISDN exchange 10.

The change-over means (41) and the converting means (42) are mounted in the Digital subscriber Line Circuit Controller (DLCC) 11 which inherently includes therein the LAPD termination unit 12. Note that, in FIG. 6, the D-channel line (Dch) is illustrated as a single line, but the line (Dch) includes an upstream line and a downstream line.

In the present invention, when carrying out a D-channel test while supplying the D-channel signal to the Link Access Procedure on the D-channel (LAPD) termination unit 12, the change-over unit 41 is activated to apply the D-channel signal to the format conversion unit 42 in which the D-channel signal is transformed into a signal having the B-channel signal format. Thus the D-channel signal is virtually treated as an ISDN signal acceptable by the ISDN exchange 10.

Figure 7:
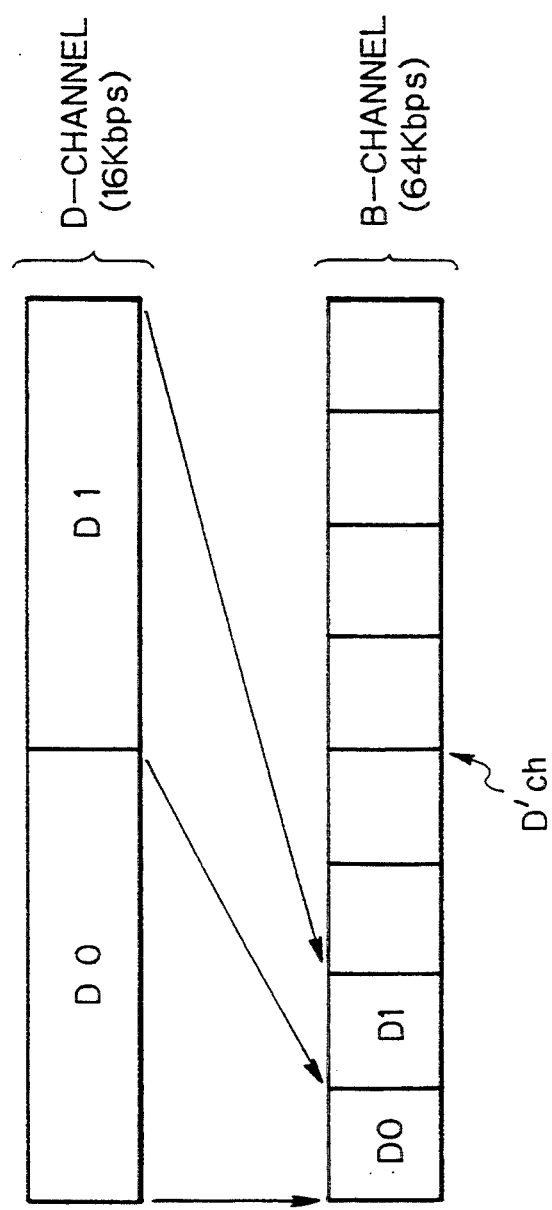
FIG. 7 schematically depicts a signal format conversion from a D-channel signal to a B-channel signal.

FIG. 7 schematically depicts a signal format conversion from a D-channel signal to a B-channel signal. In FIG. 7, the original D-channel signal (D0, D1) of 16 kbps is transformed into the converted D-channel signal (see D'ch in FIG. 6) of 64 kbps.

Referring again to FIG. 6, the Digital subscriber Line Circuit Controller (DLCC) 11 usually transfers two B-channel signals (B1, B2) between the Digital subscriber Line Circuit (DLC) 13 and the ISDN exchange 10. Further, in the DLCC 11, the D-channel signal Dch separated in the DLC 13 is terminated at the LAPD termination unit 12. When the D-channel test is to be carried out, a change-over command is applied from, e.g., the CPR 17 to the change-over unit 41. In this way, the D-channel signal is transferred to the format conversion unit 42. The format conversion unit 42 converts the upstream D-channel signal Dch of 16 kbps into the signal D'ch having the B-channel signal format of 64 kbps, so that the converted D-channel signal D'ch is received by the ISDN exchange 10. The thus received D-channel signal is treated as a usual ISDN signal. At this time, a downstream D-channel signal corresponding to the above mentioned upstream D-channel signal is also prepared, and the downstream D-channel signal is applied, via the format conversion unit 42, to the change-over unit 41 to reach the DLC 13.

Thus, after the conversion in format of the D-channel signal of the DLC 13 into the B-channel signal of the ISDN exchange 10, the converted D-channel signal is connected, through the exchange 10, to the test equipment 43. The test equipment 43 generates a downstream bit pattern, as a test signal, which is applied, through the exchange 10, to the format conversion unit 42 in the DLCC 11 so that the test signal is transformed into the D-channel signal and transmitted as the the D-channel of the subscriber through the change-over unit 41. The thus transmitted D-channel signal is returned at the Digital subscriber Line Circuit (DLC) 13 or at the network termination (NT). The thus returned D-channel signal appears on the upstream D-channel and travels the path which is reversed from the aforesaid downstream path. Namely, the thus returned D-channel signal travels along the path, i.e., the change-over unit 41 in the DLCC 11 → the format conversion unit 42 → the ISDN exchange 10, and reaches the test equipment 43.

The equipment 43 compares the transmitted bit pattern and the received bit pattern to measure a bit error rate.

By rearranging the internal switch connection in the change-over unit 41, it is also possible to investigate the D-channel signals which are received and transmitted by the LAPD termination unit 12 by dropping the D-channel signals into the output line of the ISDN exchange 10, which enables monitoring of the LAPD termination unit without having any effect on the operation of the LAPD termination unit.

The test facilities shown in FIG. 6 will be more clarified with reference to the following figures.

Figure 8:
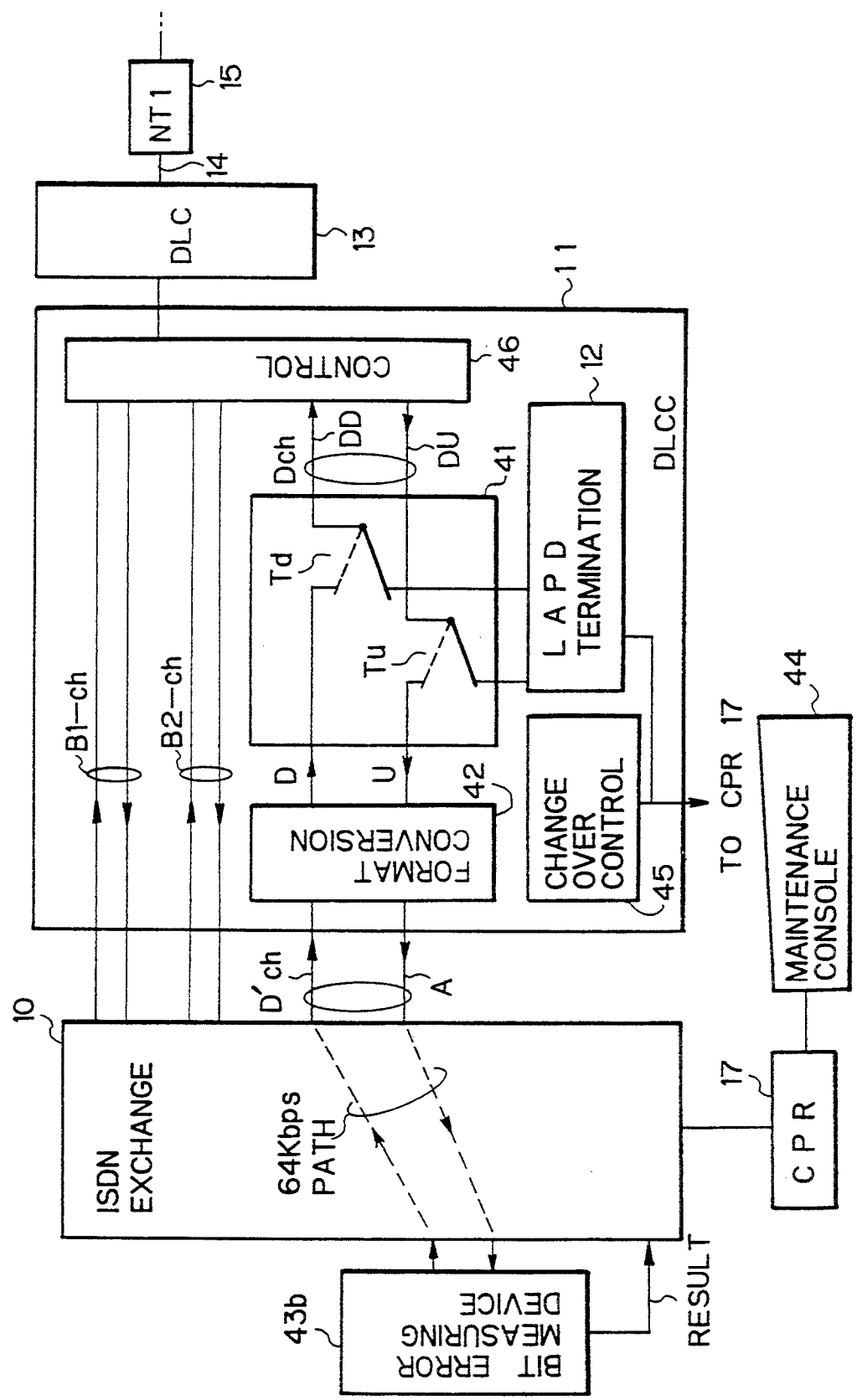
FIG. 8 illustrates a first embodiment of the basic construction shown in FIG. 6.
Figure 9:
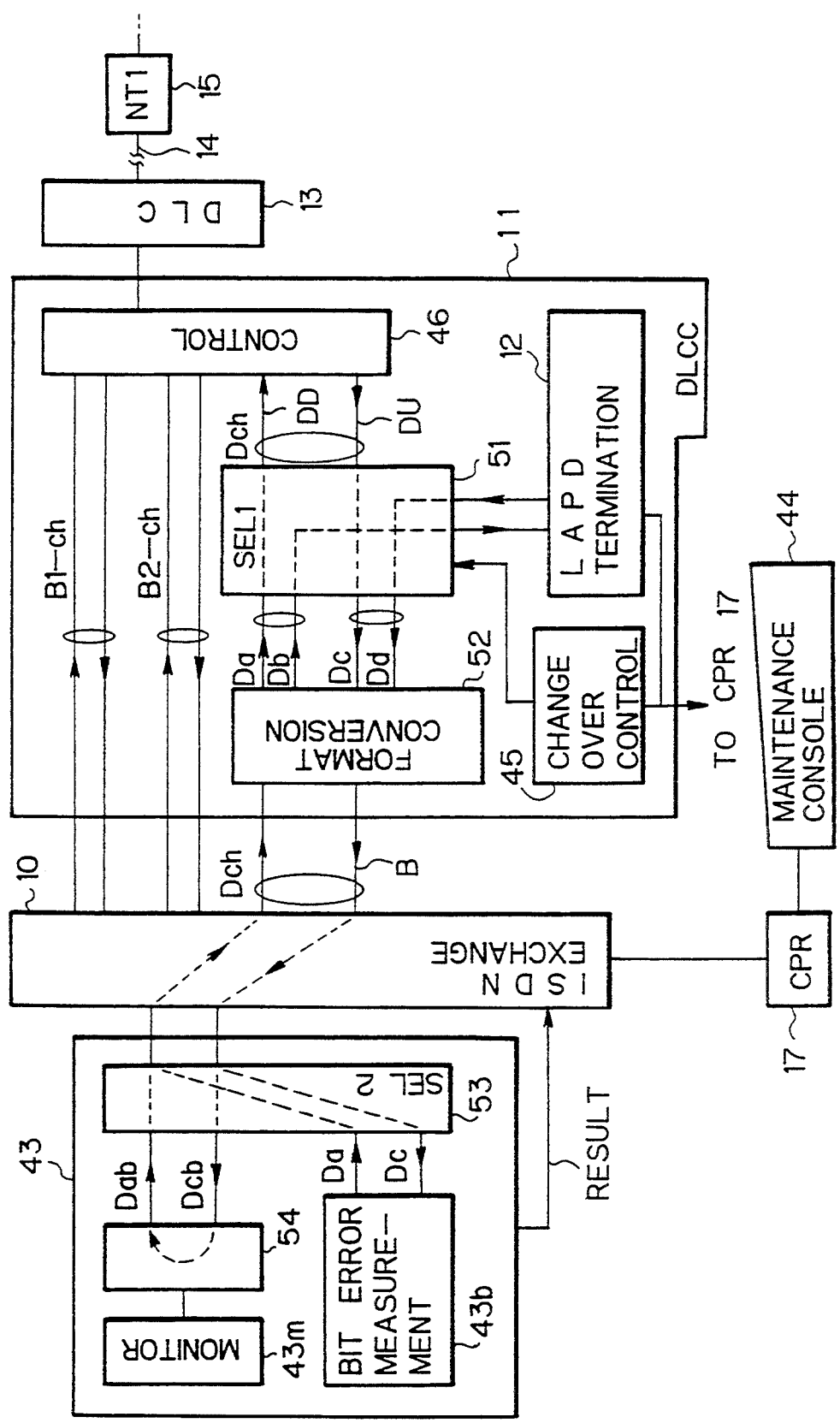
FIG. 9 illustrates a second embodiment of the basic construction shown in FIG. 6.
Figure 10:
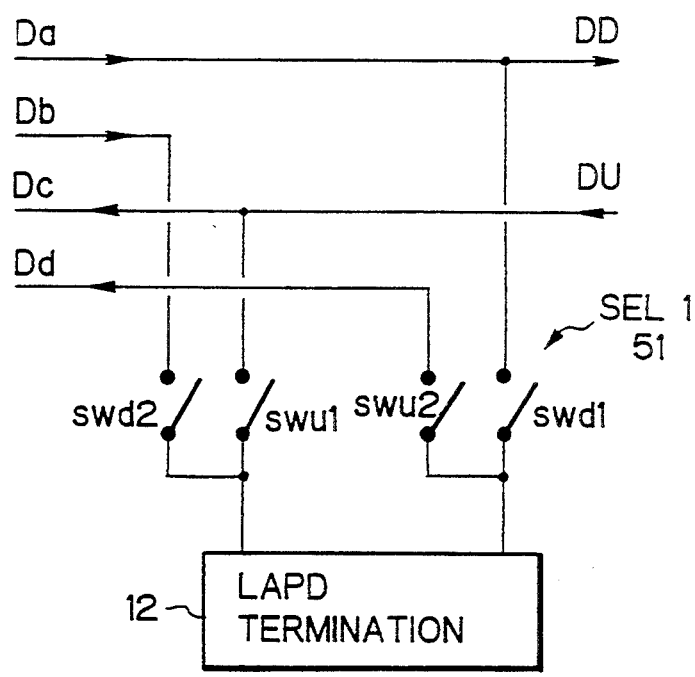
FIG. 10 illustrates a specific arrangement of switches used in a first selector of FIG. 9.
Figure 11:
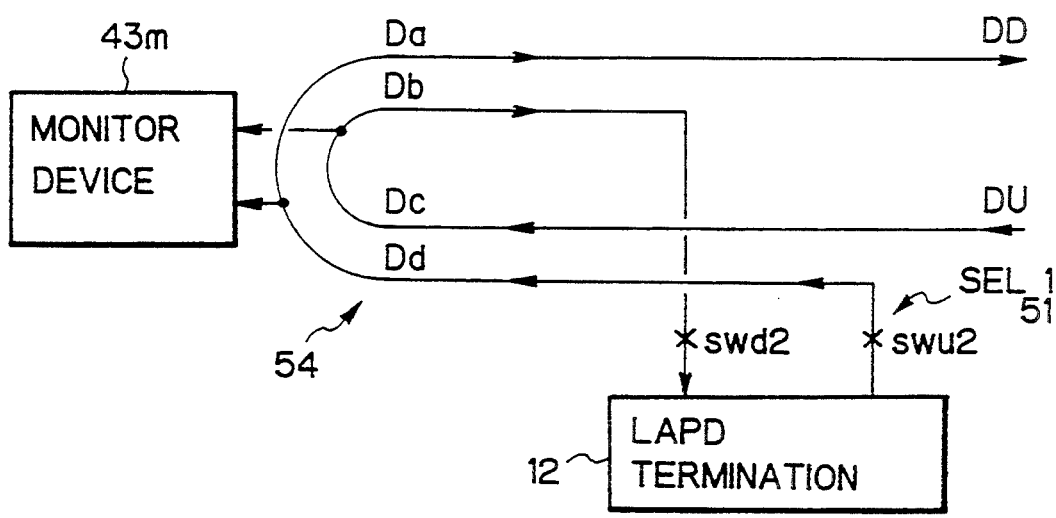
FIG. 11 schematically illustrates connection paths for a monitoring operation achieved in the system of FIG. 9.
Figure 12A:
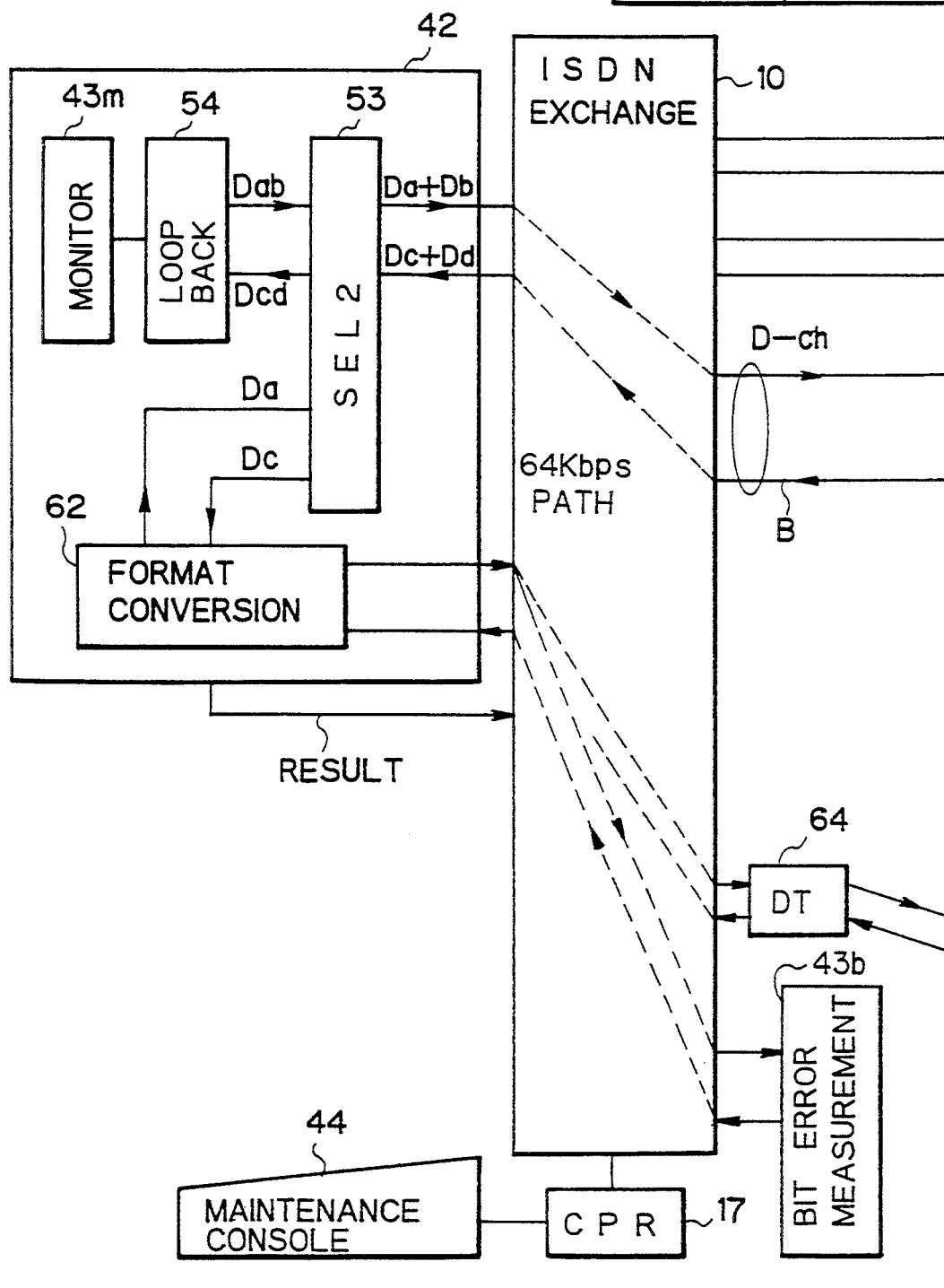
FIG. 12A and 12B illustrate a third embodiment of the basic construction shown in FIG. 6.
Figure 12B:
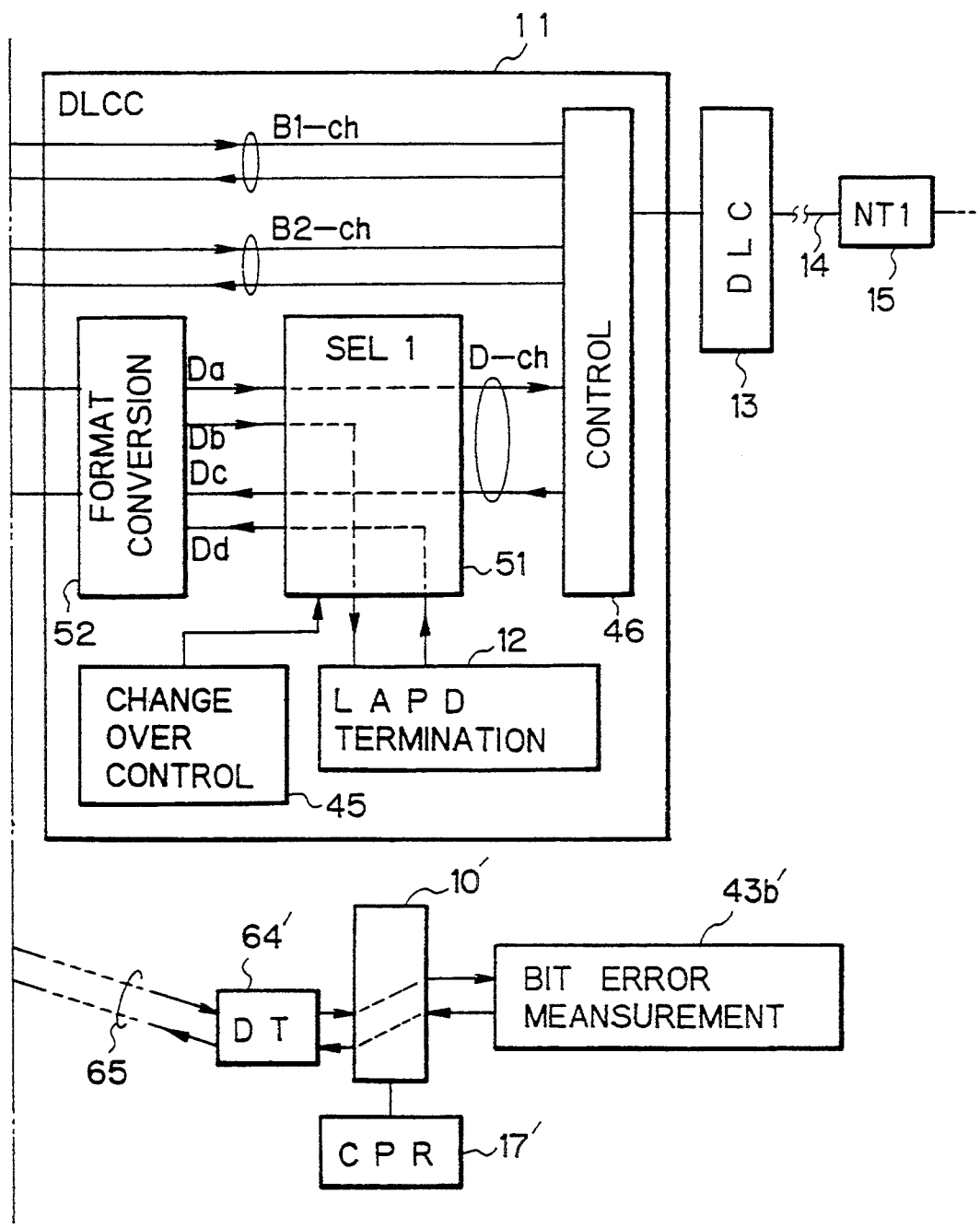
Figure 13A:
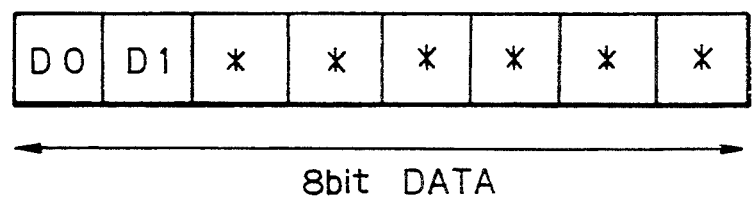
FIGS. 13A and 13B depict signal formats appearing at a point A of FIG. 8 and a point B of FIGS. 9 and 12, respectively.
Figure 13B:
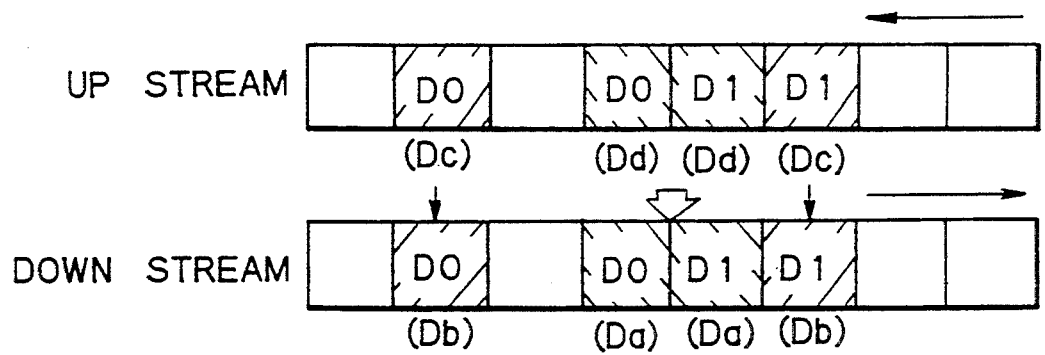

FIG. 8 illustrates a first embodiment of the basic construction shown in FIG. 6, FIG. 9 illustrates a second embodiment of the basic construction shown in FIG. 6, FIG. 10 illustrates a specific arrangement of switches used in a first selector of FIG. 9, FIG. 11 schematically illustrates connection paths for a monitoring operation achieved in the system of FIG. 9, FIG. 12 illustrates a third embodiment of the basic construction shown in FIG. 6, FIGS. 13A and 13B depict signal formats appearing at a point A of FIG. 8 and a point B of FIGS. 9 and 12, respectively.

In FIG. 8, when carrying out the D-channel test, the Link Access Procedure on the D-channel (LAPD) termination unit 12 is released and the D-channel signal from the subscriber side is converted in bit format to become the B-channel signal to connect with the ISDN exchange 10. On the other hand, a bit error measuring device 43b of the test equipment 43 receives the thus converted D-channel signal from the ISDN exchange 10 to achieve a bit error measurement.

During a usual operation of the Digital subscriber Line Circuit Controller (DLCC) 11, change-over switches of the change-over unit 41 assume a state as shown by solid lines in FIG. 8. This being so, the downstream D-channel signal "DD" and the upstream D-channel signal "DU" are terminated at the LAPD termination unit 12, so that the D-channel signal is communicated between the subscriber ISDN terminal equipment and the LAPD termination unit 12 through the Digital subscriber Line Circuit (DLC) 13 and the Network Termination (NT1) 15. Thereafter, the path for transferring the B-channel signals B1 and B2 (B1-ch, B2-ch) can be set between a calling party and the destination party.

If it is desired to achieve the D-channel test, a D-channel test command is issued from a maintenance console 44 and applied to the Call Processor (CPR) 17. The CPR 17 sends a test command to the related DLCC 11 at its change-over control unit 45. Upon receipt of the test command, the unit 45 activates the change-over unit 41 to release the LAPD termination unit 12.

Under the above conditions, the upstream D-channel signal "DU" of 16 kbps is converted in bit format into the B-channel bit format of 64 kbps to reach the ISDN exchange 10. The corresponding downstream converted D-channel signal from the ISDN exchange 10 is inversely converted in bit format by the unit 42 to become the D-channel signal "DD" to reach the control unit 46.

Now referring to FIGS. 13A, the converted D-channel signal output from the format conversion unit 42 of FIG. 8 appears at the point A, i.e., the input of the ISDN exchange 10 with the bit format depicted in this FIG. 13A. The B-channel signal, i.e., the converted D-channel signal is composed of 8 bit data which carries therein the D-channel bits D0 and D1 converted at the format conversion unit 42 of FIG. 8. In the example of FIG. 13A, the original D-channel signal of 64 kbps is converted into the two bits in the B-channel signal format. In this case, the remaining six bits are not used.

On the other hand, the Call processor 17 of FIG. 8 applies a command, responding to the instruction from the maintenance console 44, to make a connection path for test in the ISDN exchange 10. In this way, the bit error measuring device 43b can be connected, through the 64 kbps path in the ISDN exchange 10, to the format conversion unit 42.

In the above D-channel test, the D-channel signal "DD" is returned at the Digital subscriber Line Circuit (DLC) 13 or the Network Termination (NT1) 15. The thus returned signal travels along the upstream D-channel line. Thereafter, the bit error measuring device 43b generates the aforesaid bit patter for testing and sends the same to the downstream D-channel line in the form of a B-channel signal at 64 kbps to reach the format conversion unit 42 in the Digital subscriber Line Control Circuit (DLCC) 11 through the ISDN exchange 10 and the downstream line, whereby the D-channel signal formatted in the B-channel is converted to the inherent D-channel signal and sent, via the change-over unit 41 and the control unit 46, to the Digital subscriber Line Circuit (DLC) 13. The control unit 46 performs bit composition and bit decompositon of the well known 2B+D+INF (information) format, in a usual manner.

In FIG. 8, a loopback is formed beforehand at the DLC 13 or the subscriber side and the aforesaid bit pattern for the test is returned, through the upstream D-channel, to the Digital subscriber Line Circuit Controller 11. The thus returned signal is decomposed by the control unit 46 to become the upstream D-channel signal "DU" and the signal "DU" is converted into the B-channel signal at the unit 42 to reach the bit error measuring device 43b through the path shown by broken lines in the ISDN exchange 10. The bit error measuring device 43b receives the returned D-channel signal (bit pattern) and compares same with the bit pattern which has been sent before therefrom to examine an occurrence of a bit error. The result "RESULT" of the above examination is given to the Call Processor (CPR) 17 and is further displayed on the maintenance console 44.

As mentioned above, generally speaking, according to the first embodiment, the change-over means (41) is comprised of both an upstream side transfer switch Tu and a downstream side transfer switch Td, where the upstream and downstream side switches Tu, Td are connected to the converting means (42) when a bit error measurement is to be achieved by the testing means (43b) through the ISDN exchange 10.

The second embodiment will be explained below with reference to FIG. 9. Generally speaking, a change-over means (51) is comprised of a first selector (SEL1) having a first switch part used for applying a transmission signal from the LAPD termination unit 12 to the converting means (52) and a second switch part used for applying a reception signal from the converting means (52) to the LAPD termination unit 12.

When a monitoring test is to be carried out by a testing means (43m), the first selector SEL1 operates such that the transmission signal from the LAPD termination unit 12 as well as the upstream D-channel signal of the subscriber side are given to the converting means (52), while the upstream signal from the subscriber and the transmission signal from the LAPD termination unit 12, both are returned, after the monitoring test, from the testing means (43m) and output from the converting means (52), and are given, respectively, to the reception side of the LAPD termination unit 12 and to the subscriber side.

When a bit error measurement is to be carried out, a measuring equipment (43b) in the testing means (43) generates a predetermined bit pattern. The DLCC 11 is operative to release the LAPD termination unit 12, receive the bit pattern given through the ISDN exchange 10 and convert the same from the B-channel signal format to the D-channel signal format by the converting means (52) to send the same to the subscriber side. The DLCC 11 is then operative to receive the thus sent D-channel signal sent to the subscriber side and returned thereto, convert the thus returned D-channel signal into the B-channel signal at the converting means (52) and send the D-channel signal containing the bit pattern to the measuring equipment (43b) through the ISDN exchange 10 to check matching between the sent bit pattern and the received bit pattern.

To be more specific, in FIG. 9, the change-over unit 51 is comprised of the first selector SEL1. The format conversion unit 52 can handle every two channels at the upstream side and the downstream side, respectively.

The test equipment 43 is set up as both the monitoring device 43m and the bit error measuring device 43b. The device 43m monitors the content, e.g., the protocol, of the D-channel signals which are sent and received between the LAPD termination unit 12 and the subscriber ISDN terminal equipment. Further a loopback unit 54 is mounted in the test equipment 43, and the unit 54 returns the received signal. Furthermore, a second selector (SEL2) 53 is also mounted in the test equipment 43, and selects either the monitor test mode or the bit error test mode.

Referring to FIG. 10 illustrating a specific arrangement of switches in the first selector (SEL1) 51 in FIG. 9, the first selector 51 has switch swd1 and a switch swu1 which work, if they are turned ON, to apply the downstream D-channel signal DD and the upstream D-channel signal DU to the LAPD termination unit 12, respectively, to perform a usual communication between the LAPD termination unit 12 and the subscriber ISDN terminal equipment.

Further, the transmission signal from the LAPD termination unit 12 is applied to the upstream path Dd, when a switch swu2 is turned ON, and reaches the format conversion unit 52. On the other hand, the output signal from the format conversion unit 52 is given to the downstream path Db to reach the input of the LAPD termination unit 12, when the switch swd2 is turned ON. the switches swd2 and swu2 are turned ON when the monitoring test of the D-channel signal is to be carried out.

Further, if all the switches swd1, swu1, swd2 and swu2 are all turned OFF, i.e., the LAPD termination unit 12 is released, the bit error measurement can be carried out.

The operation of the testing facilities of the second embodiment (FIG. 9) will more be clarified with reference to FIGS. 10 and 11. In a usual communication mode, the first selector 51 in the DLCC 11 assumes the switch status as shown in FIG. 10, wherein the switch swd1 and swu1 are both turned ON to enable sending and receiving of the D-channel signal between the LAPD termination unit 12 and the subscriber side.

If it is required to monitor the D-channel signals transferred in the above usual mode, the related monitor command is issued from the maintenance console 44. The CPR 17, in response to the monitor command, outputs the corresponding control signal which is given to the DLCC 11 and the exchange 10.

The control signal applied to the DLCC 11 is received by the change-over control unit 45 which turns the switches swd2 and swu2 ON and switches swd1 and swu1 OFF, and thereby the connection paths schematically illustrated in FIG. 11 are created.

Namely, the transmitted D-channel signal DU from the subscriber side is converted as a signal Dc having the B-channel signal format. At this time, if the transmission D-channel signal from the LAPD termination unit 12 is given, via the switch swu2 as the signal Dd, the two signals Dc and Dd are converted into the D-channel signal of the B-channel signal format to reach the ISDN exchange 10. The signal now appearing at the point B (FIG. 9), i.e., the input of the exchange 10 has the signal format depicted as the upstream signal in FIG. 13B. Namely, the two bits D0 and D1 of each of the paths Dc and Dd are disposed as shown and input to the ISDN exchange 10.

The upstream converted D-channel signal is input to the test equipment 43 under control of the CPR 17. At this time, the second selector (SEL2) 53 has switched to the monitor test side under control of the CPR 17, and thus, the received signal is input to the loopback unit 54. When the signal is returned to the loopback unit 54, the signal is monitored by the monitoring device 43m. The thus returned signal is input to the exchange 10 in the form of the B-channel via the second selector 54 and then output, under control of the CPR 17, to the DLCC 11.

The downstream D-channel signal of the B-channel format is composed of, as shown in FIG. 13B, a signal Da (corresponding to the transmission signal Dd from the LAPD termination unit 12) and a signal Db (corresponding to the transmission signal Dc from the subscriber side). This downstream D-channel signal of the B-channel format is decomposed into the signals Da and Db at the bit format converter (format conversion unit 52). The decomposed signal Db is given to the LAPD termination unit 12 as a reception signal via the switch swd2, while the decomposed signal Da is transmitted, as the downstream D-channel signal DD, to the subscriber side.

Thus, the monitor unit 43m is able to monitor both the D-channel signal sent from the subscriber side to the DLCC 11 and the D-channel signal sent from the DLCC 11 to the subscriber side.

The bit error measurement can also be achieved in the second embodiment (FIG. 9). In the bit error test mode, the CPR 17 outputs a command to the change-over control unit 45 to turn all the switches swd1, swd2, swu1 and swu2 in the selector 51 OFF. The CPR 17 also outputs a command to the second selector (SEL2) 53 and the selector 53 changes to the bit error test mode by connecting the path to the bit error measuring device 43b. Thereafter, the bit error measuring device 43b generates the bit pattern and sends the same to the subscriber side, as it does in the first embodiment (FIG. 8). The bit pattern signal is input, as the signal Da, to the B-channel of the exchange 10 and is then applied to the format conversion unit (bit format converter) 52 of the DLCC 11 to reach the subscriber side as the signal DD. The signal DD is returned to the loopback point which has been specified beforehand at the subscriber side. The thus returned signal is received, as the signal DU, at the DLCC 11 and further converted to the signal Dc of the B-channel format. The signal Dc finally reaches, via the exchange 10, the bit error measuring device to achieve the bit error measurement test.

The third embodiment will be explained below with reference to FIG. 12 (FIGS. 12A and 12B). Generally speaking, the testing means has a remote measuring equipment (43b) and an additional converting means (62) mounted therein. The remote measuring equipment (43b) is connected to another line accommodated in the related ISDN exchange 10, in which the bit pattern is communicated between the subscriber side and the measuring equipment (43b) through the additional converting means (62) and the ISDN exchange 10.

The testing means has a remote measuring equipment (43b') and an additional converting means (62) mounted therein. The remote measuring equipment (43b') is connected to one of lines accommodated in another remote ISDN exchange 10', in which the bit pattern is communicated between the subscriber side and the remote measuring equipment (43b') through the additional converting means (62), the related ISDN exchange 10, the remote ISDN exchange 10' both digital trunks 64, 64' cooperating with these two ISDN exchanges 10, 10' and a relaying line 65 connected between the two digital trunks 64, 64'.

To be more specific, in FIG. 12, the additional format conversion unit 62 is connected between the ISDN exchange 10 via two-way lines and the second selector (SEL2) 53 via lines through which the upstream D-channel signal Da and the downstream D-channel signal Dc are transferred. Reference numeral 43b in this figure denotes a remote bit error measuring device connected to another line accommodated in the ISDN exchange 10.

In the third embodiment, it is possible to achieve the monitoring test for the D-channel of any DLC 13, as in the second embodiment. When the bit error measurement and a protocol monitoring are to be carried out, the related tests can be done in two ways. First, the test can be done at the ISDN exchange (10) side. Second, the test can be done as a remote test at another remote ISDN exchange 10'. In FIG. 12, the ISDN exchange 10 is provided with the bit error measuring device 43b, and/or the remote ISDN exchange 10' is provided with the bit error measuring device 43b. It should be understood that, although only the bit error measuring devices 43b and 43b' are illustrated as the test equipment in FIG. 12, it is also possible to use the monitoring devices, e.g., protocol monitors, as the test equipment instead of these bit error measuring devices.

Assuming a case where the bit error measurement is conducted, the CPR 17 of the ISDN exchange 10 is given a command from the maintenance console 44 to turn all the switches (refer to FIG. 10) in the selector 51 OFF by way of the change-over control unit 45 in the DLCC 11, and then the connection paths between the test equipment 63 and the conversion unit 52 through the exchange 10 are set up by controlling the exchange 10 from the CPR 17. The connection paths carry the signals of 64 kbps.

Next, the second selector 53 is controlled by the CPR 17 to make the connection paths with the exchange 10 through the additional conversion unit 62 transfer the upstream signal Da and the downstream signal Dc. In this case, other paths for connecting the additional format conversion unit 62 and the bit error measuring device 43b are also set up in the exchange 10 on which the D-channel signal of the B-channel format at 64 kbps is transferred.

After creation of the above mentioned connection paths, the bit error measuring device 43b generates the bit pattern. The bit pattern travels through the exchange 10, the format conversion unit 62 and the second selector 53 to reach the exchange 10 again. The bit pattern is then applied to the DLCC 11 and converted into the inherent D-channel signal therein. The D-channel signal is transmitted from the DLCC 11 and returned to any desired portion at the subscriber side. The thus returned signal reaches the bit error measuring device 43b again through the path inverse to the above mentioned path, wherein the bit error rate can be measured.

In the above case, the location of the bit error measuring device 43b and/or the protocol monitoring device can be freely determined by an operator where it is considered convenient.

The above test can also be achieved at the remote ISDN exchange 10' or a Central Maintenance Operation Center (CMOC). Namely, a connection path is set up between the remote bit error measuring device 43b' of the exchange 10 and the digital trunk 64 of the exchange 10 through the digital trunk 64' and the relaying line 65. The CPR 17' transmits a control signal demanding the bit error measurement to the CPR 17 of the exchange 10 through the digital trunks 64' and 64. Responding to the received control signal, the CPR 17 sets up a connection path of 64 kbps for transferring the D-channel signal via the trunk 64.

It should be understood that, during the above test, the format conversion unit 52, the first selector 51, and the control unit 46 function as in the second embodiment.

As mentioned above, the D-channel test can be achieved between the subscriber side and the ISDN exchange.

The B-channel test achieved by the test facilities according to the present invention will be described below.

Figure 14:
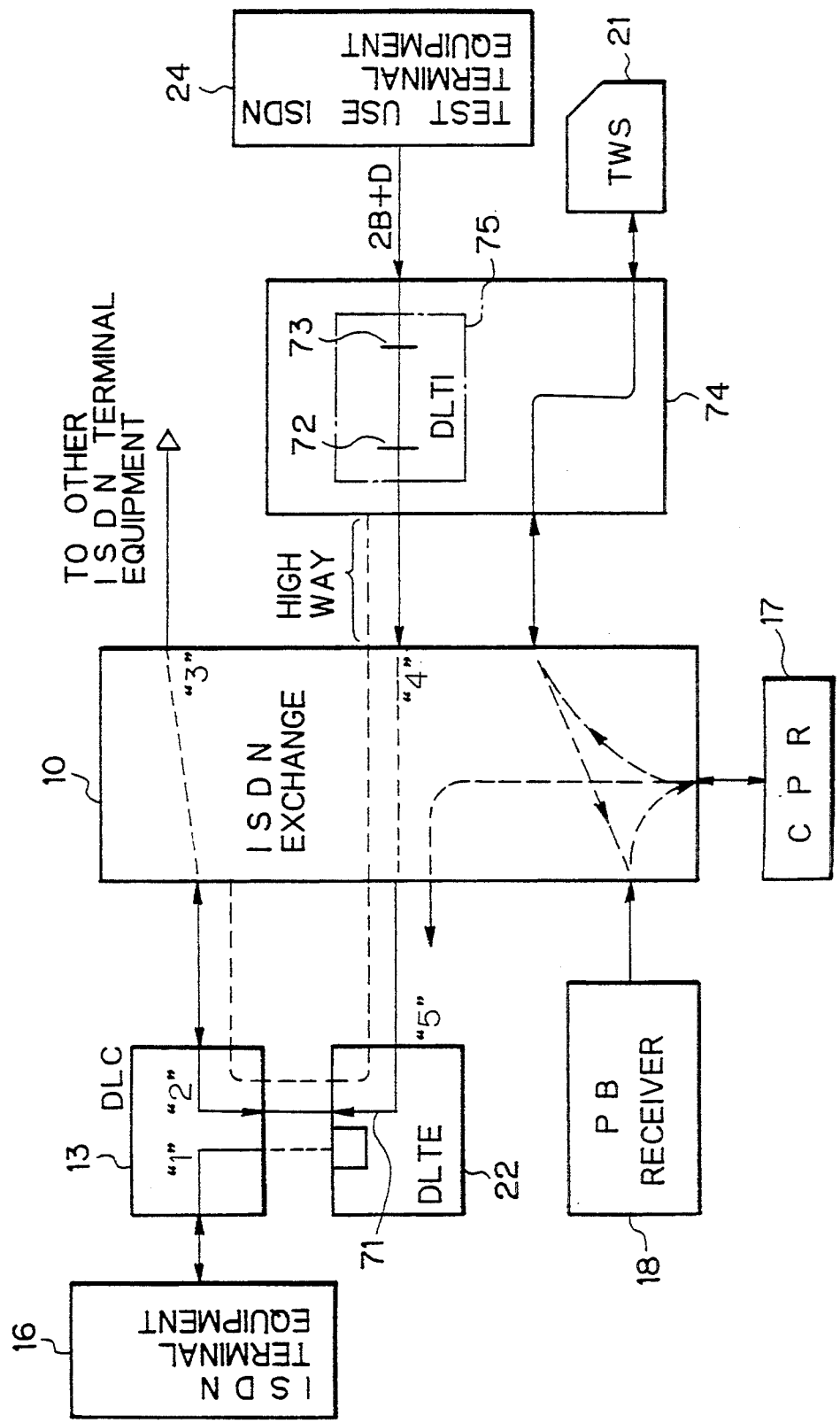
FIG. 14 illustrates a basic construction of the ISDN switching system having testing facilities for the B-channels according to the present invention.

FIG. 14 illustrates a basic construction of the ISDN switching system having testing facilities for the B-channels according to the present invention. Generally speaking, the aforesaid converting means is comprised of a Digital subscriber Line Test Interface (DLTI) 75 mounted in a subscriber test interface trunk 74, the DLTI 75 is connected between one of the lines accommodated in the ISDN exchange 10 and the test use terminal equipment 24 which forms a part of the testing means. The DLTI 75 is comprised of both an exchange interface 72 and an S/T point interface 73 to perform a signal format conversion between a highway data format and a (2B+D) channel data format.

A test line dropper 71 is formed, as a part of the testing means, in the Digital subscriber Line & Trunk test Equipment (DLTE) 22 to form a loopback through the corresponding Digital subscriber Line Circuit (DLC) 13 to and from the ISDN exchange 10. The DLC 13 is connected to the object (16) to be tested so that the Bridge Cut-Off (BCO) test is achieved between the test use ISDN terminal equipment 24 and other ISDN terminal equipment (for testing) through the ISDN exchange 10.

To be specific, in FIG. 14, the subscriber telephone number of the object (16) is specified at the Test Work Station (TWS) 21. The telephone number signal is received by the PB receiver 18 through the subscriber test interface trunk 74 and the ISDN exchange 10. The related telephone signal is given, as a code signal, to the Call Processor (CPR) 17. If the CPR 17 recognizes that the object specified by the input telephone number is a digital terminal (not an analog terminal), the TWS 21 is informed of an OK signal from the CPR 17.

After that the CPR 17 investigates whether the Object (16) is in-use or not and the result is sent again to the TWS 21. If the object is not in-use, the test line dropper 71 is formed in the Digital subscriber Line & Trunk test Equipment (DLTE) 22 to set up a test path between the Digital subscriber Line Circuit (DLC) 13 and the equipment 22, and thus the system is ready for the BCO test.

According to this system, the BCO test can be achieved through any line accommodated in the ISDN exchange 10. For example, the BCO test can be achieved from the remote Central Maintenance Operation Center (CMOC).

Figure 15:
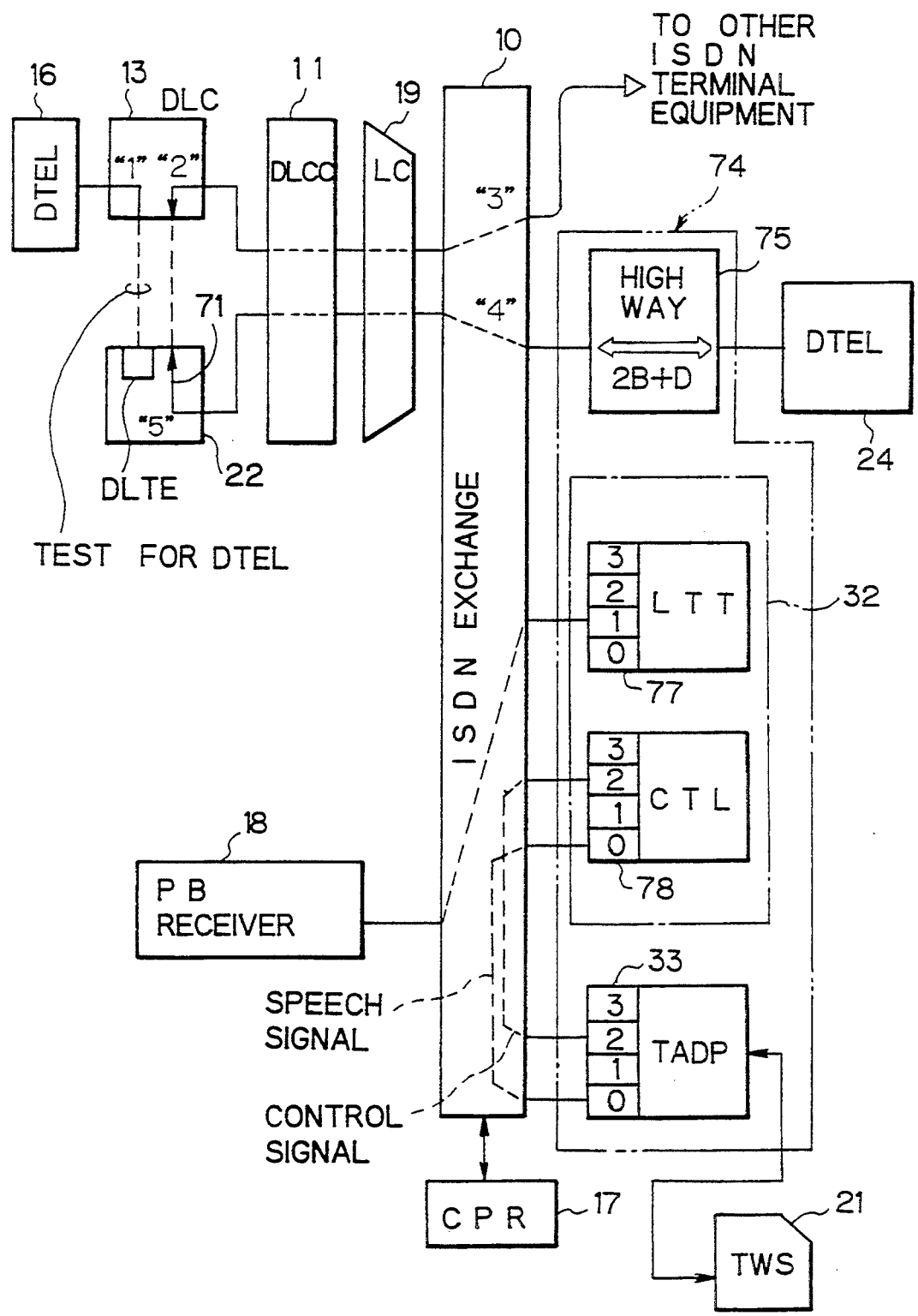
FIG. 15 illustrates a fourth embodiment of the present invention.

FIG. 15 illustrates a fourth embodiment of the present invention. The fourth embodiment is based on the system shown in FIG. 14. In FIG. 15, the Analog Line test Trunk (ALTI) 32 includes a Line test trunk (LTT) 77 and a controller (CTL) 78, which functions as an interface between the Test Work Station (TWS) 21 and the ISDN exchange 10.

The DLTE 22 includes the aforesaid test line dropper 71. The DLCC 11 controls relay switches mounted in the DLC 13, the relay switches changing an internal wiring of the DLC 13, e.g., direct connection between "1" and "2" or separation therebetween.

Figure 16:
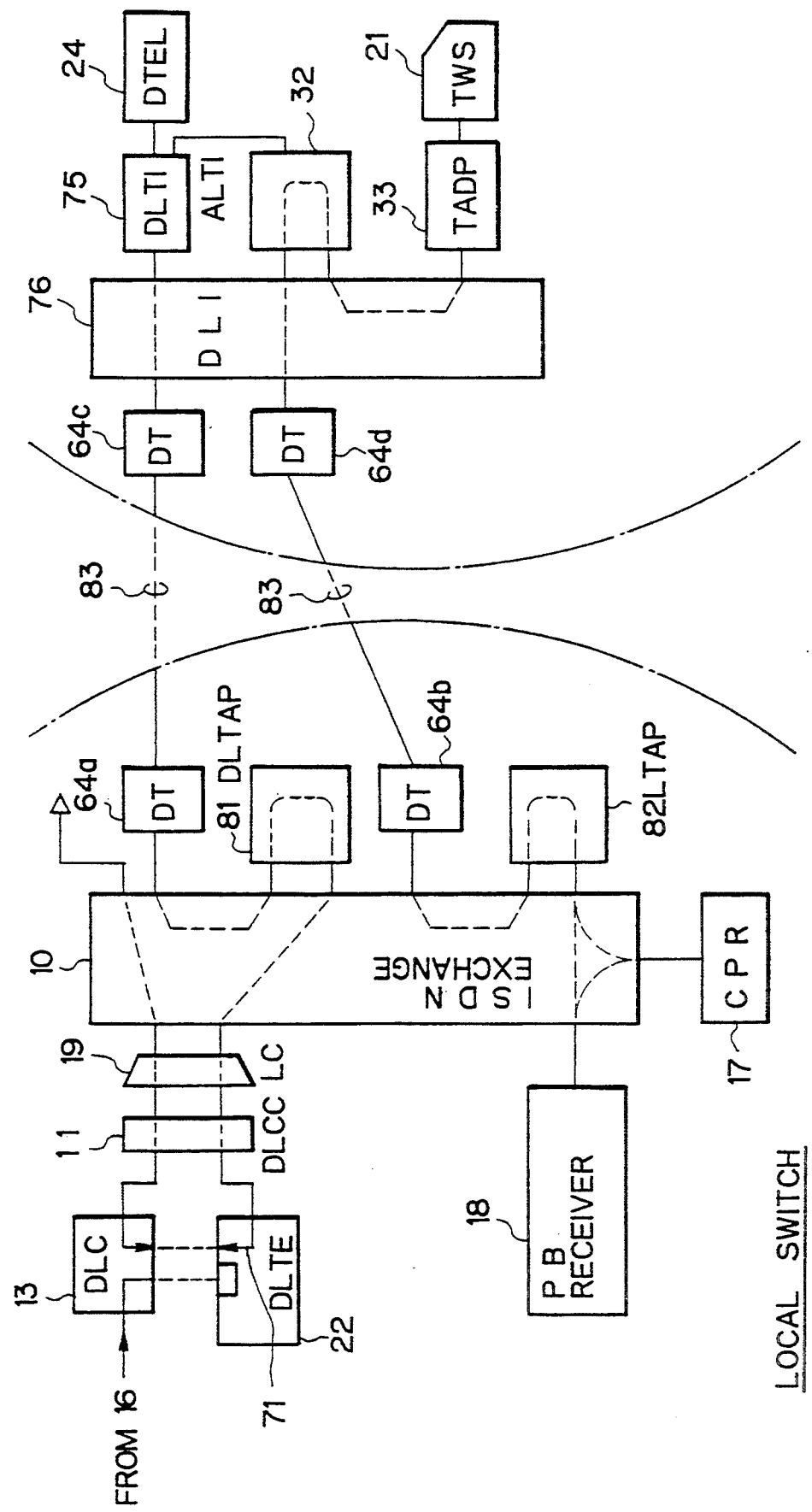
FIG. 16 illustrates a fifth embodiment of the present invention.

FIG. 16 illustrates a fifth embodiment of the present invention. The fifth embodiment is also based on the system shown in FIG. 14. Reference numerals 64a to 64d denote the digital trunks (refer to FIG. 12). Reference numeral 81 denotes a Digital Line Test Adapter (DLTAP) which relays the data from the Central Maintenance Operation Center (CMOC) via relay line 83 to the ISDN exchange 10.

Reference numeral 82 denotes a Line Test Adapter (LTAP) which is similar to the aforesaid DLTAP 81, but the LTAP 82 is further provided with a control channel of the signal for analog subscribers and a control unit for the speech channels.

BASIC PROCEDURE OF BRIDGE CUT-OFF (BCO) TEST

The basic procedure of the BCO test will be explained with reference to previous FIGS. 14, 15 and 16 and the following figures.

Figure 17:
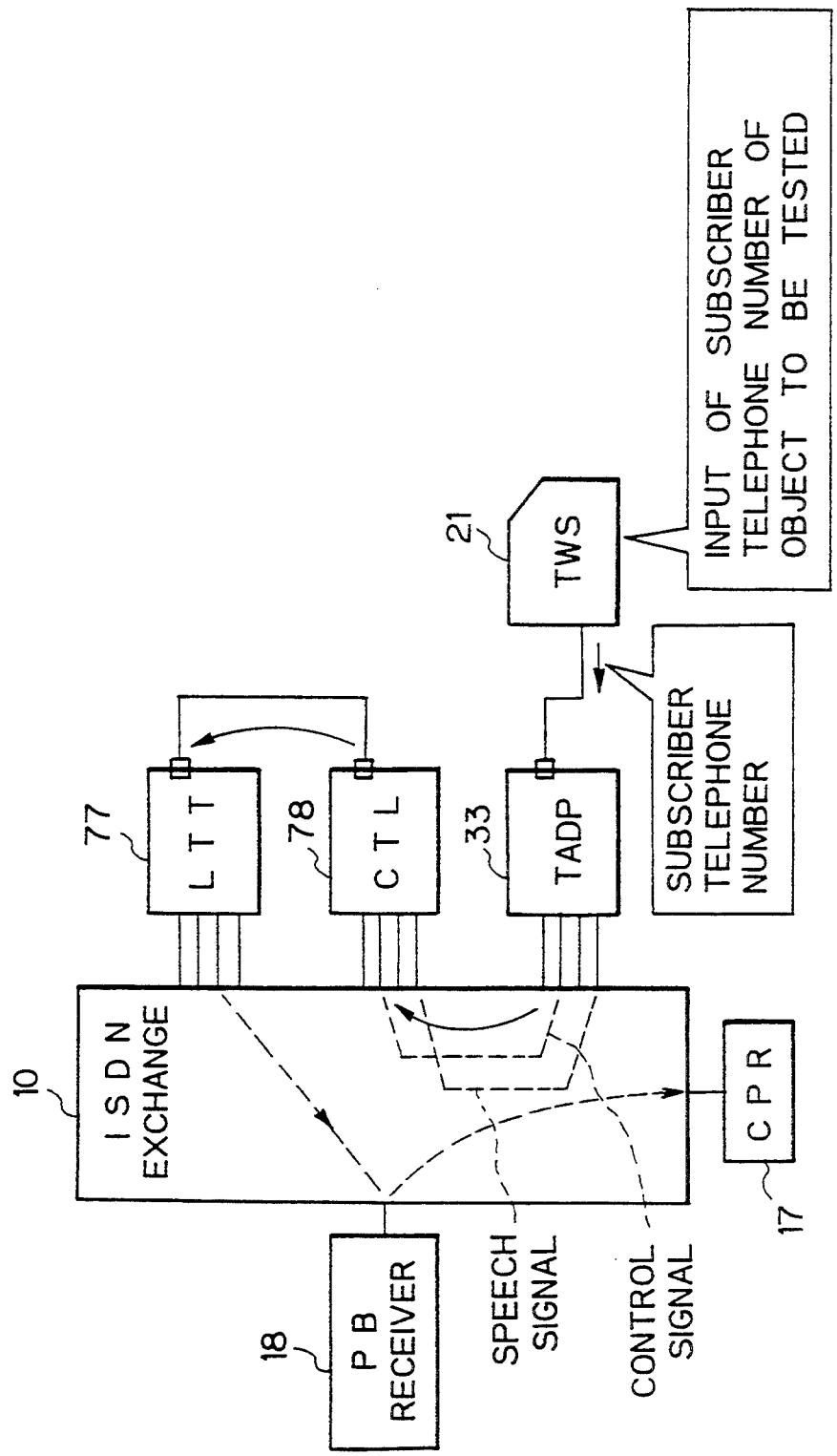
FIG. 17 is an explanatory view representing the first stage of the test operations.
Figure 18:
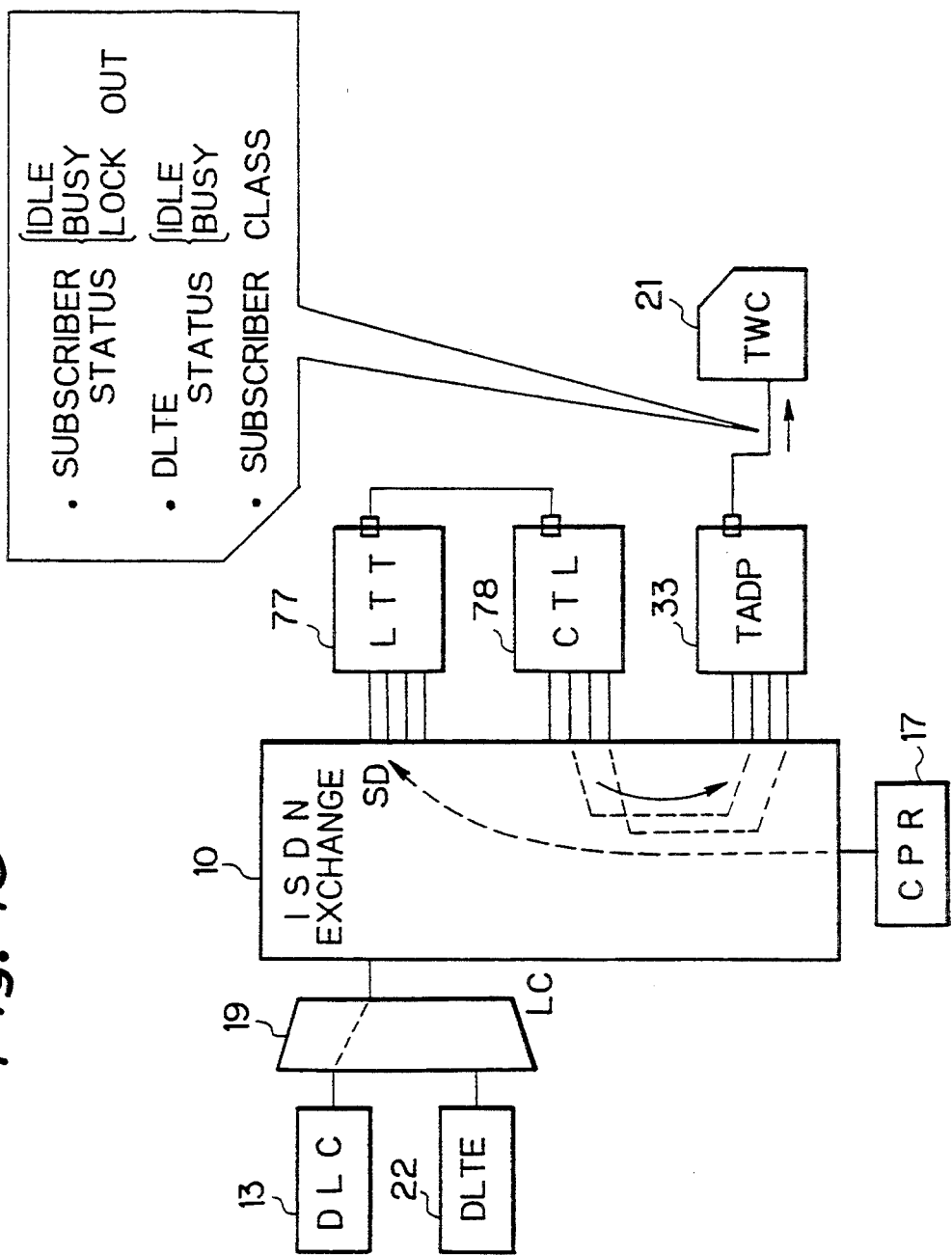
FIG. 18 is an explanatory view representing the second stage of the test operations.
Figure 19:
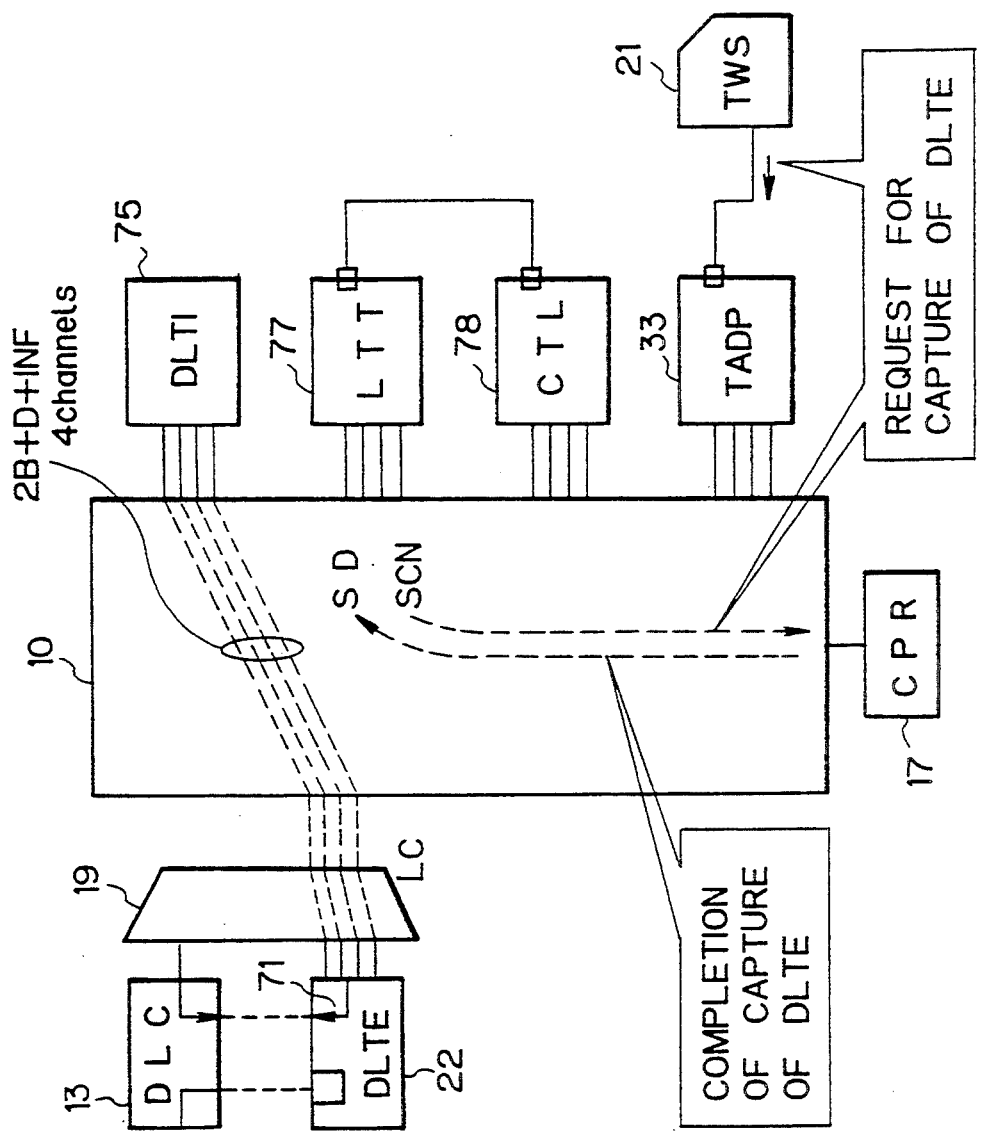
FIG. 19 is an explanatory view representing the third stage of the test operations.
Figure 20:
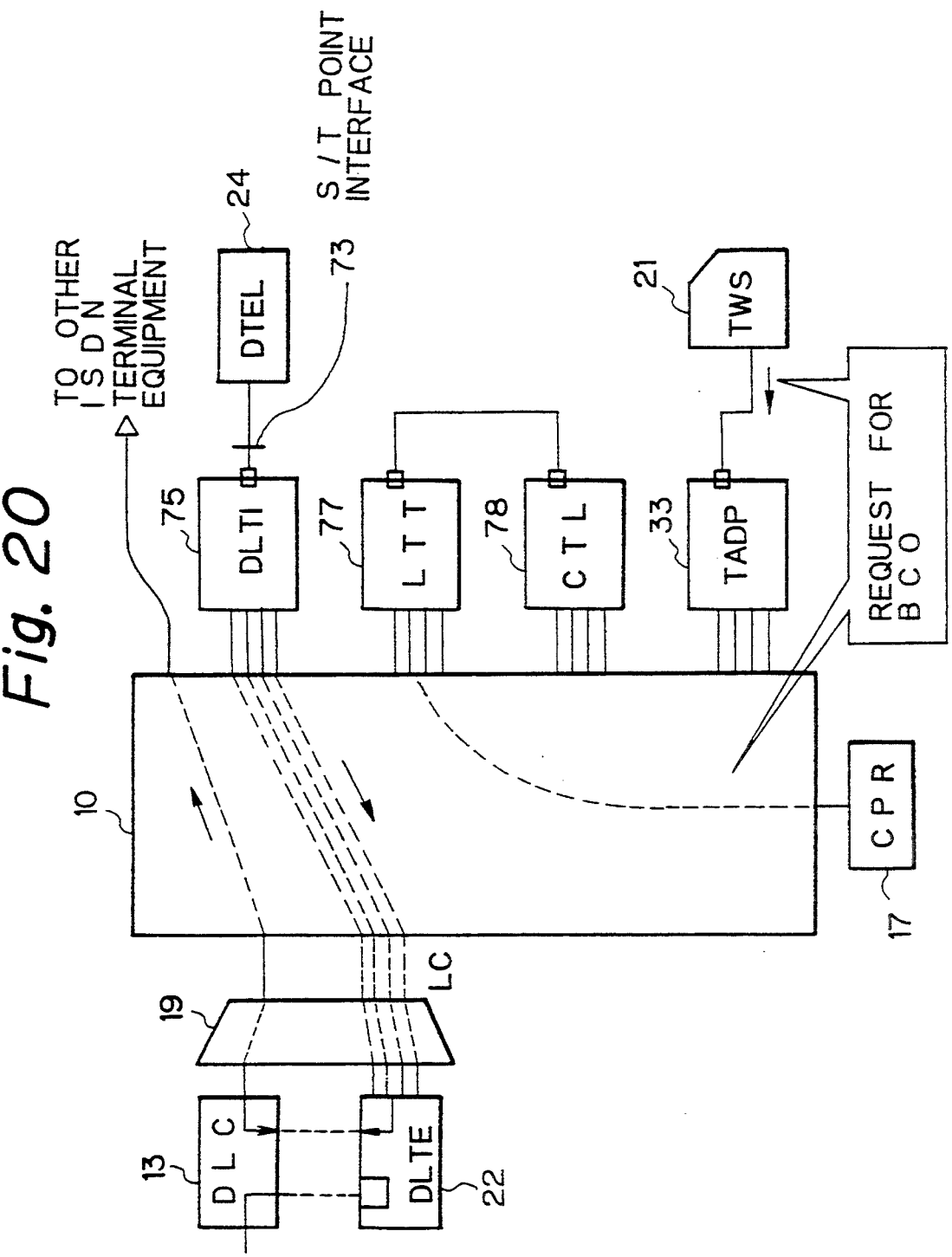
FIG. 20 is an explanatory view representing the last stage of the test operations.

FIG. 17 is an explanatory view representing the first stage of the test operations, FIG. 18 is an explanatory view representing the second stage of the test operations, FIG. 19 is an explanatory view representing the third stage of the test operations, and FIG. 20 is an explanatory view representing the last stage of the test operations.

(1) In FIG. 17, the subscriber telephone number of the object to be tested is input from the TWS 21 and applied as the subscriber number to the TADP 33. The TADP 33 produces the corresponding control signal and sends it to the controller (CTL) 78. The CTL 78 transforms the given control signal into a PB signal and sends the same to the Line Test Trunk (LTT) 77. Then the PB signal is sent to the PB receiver 18 to be encoded. The thus coded PB signal is given to the CPR 17 and the CPR 17 recognizes the same.

(2) In FIG. 18, the CPR 17 informs the TWS 21 of a variety of sets of information as send data (SD bits), which variety of sets of information are, e.g., the aforesaid subscriber class information (now indicating a digital subscriber), the status of the object (subscriber), i.e., idle, busy or lockout, and the status of the DLTE 22, i.e., idle or busy.

(3) In FIG. 19, if the DLC 13 is in a idle/lockout state and simultaneously the DLTE 22 is idle, the TWS 21 outputs an order for a request for capture of the DLTE 22 and informs the same to the CPR 17 as scan (SCN) bits (control information bits) of the LTT 77. Note that, at this stage, the DLTE 22 and the Digital subscriber Line Test interface (DLTI) 75 are connected to each through the test line dropper 71, and thus, the 2B-channels (user information channels), the D-channel (signaling channel) and INF-channel (internal information channel, i.e., four channels in total can be transferred, however, the call origination and the call destination of the object (DLC 13) is impossible to transfer.

(4) In FIG. 20, the TWS 21 informs a request for the BCO test to the CPR 17 by the SCN bit from the LTT 77, and the CPR 17 enables the object (DLC 13) to perform the call origination and the call destination. Then the related BCO test of the call origination and the call destination can be started by the transfer of the 2B+D+INF data through the path, i.e., DTEL 24 → DLTI 75 → LC 19 → DLTE 22 → DLC 13.

(5) If the BCO test is released by the TWS 21, the release order is informed to the CPR 17. Then the CPR 17 releases the path, i.e., DLTE 22 → DLTI 75 and also deenergizes the internal relay of the DLC 13 to recover the path between the DLC 13 and the DLTE 22.

PROCEDURE OF REMOTE BCO TEST BY CMOC (FIG. 16)

In FIG. 16, the test use DTEL 24 has an identical interface to that of the ISDN terminal equipment 16 and the DTEL 35a to 35d.

(1) The code indicating the local switch (LS) accommodating the object (subscriber) is input to the TWS 21 in the CMOC.

(2) When the above mentioned code reaches the ALTI 32 via the TADP 33 and the DLI 76, the code is converted into the PB signal and is sent to the digital relay line 83 via the DLI 76 and the DT 64d.

(3) When the Local Switch (LS) accommodating the object (subscriber) receives the office code at the above step (1), the path from the DT 64b is first connected to the LTAP 82.

(4) When the connection to the LTAP 82 is completed, the CPR 17 informs the fact of the connection to the TWS 21 in the CMOC via the digital relay line 83, so that the above fact is displayed on the TWS (personal computer) 21.

(5) Next, the telephone number of the object (subscriber) is input from the TWS 21.

(6) The telephone number is transmitted to the digital relay line 83 under the identical procedure to that mentioned in the above step (2).

(7) The telephone number reaches the PB receiver 18 from the LTAP 82 in the above specified Local Switch (LS) and then the CPR 17 is informed of the telephone number.

(8) The CPR 17 examines the status, i.e., idle/busy, of the specified subscriber. The TWS 21 in the CMOC is then informed of the result of the examination.

(9) If the object (subscriber) is a digital subscriber and at the same time the object is idle, the request for connection of the digital relay path is issued from the TWS 21 to set up a relay path between the DLTI 75 and the Local Switch (LS).

(10) The ALTI 32 transfers the office code to the DLTI 75 and makes a connection of the relay line to the specified LS.

(11) If the path extending to the LS is completed, the path from the DT 64d is first made to the DLTAP 81.

(12) Next, if the DLC 13 and the DLTE 22 accommodating the object (subscriber) are idle, the TWS 21 in the CMOC issues a request for capture of the DLTE 22 and the request is sent to the CPR 17 in the specified LS.

(13) The CPR 17 in the specified LS activates the internal relay of the object (DLC 13) to drop the related line to the DLTE 22. Further, the TWS 21 in the CMOC is informed of the completion of the capture of the DLTE 22. Note here that the DLC 13 still remains in the state where no call origination or destination is possible.

(14) The TWC 21 in the CMOC issues a request for the BCO test.

(15) The CPR 17 in the specified CPR 17 changes the object (DLC 13) to the state where the call origination and destination is possible.

(16) The test use DTEL 24 in the CMOC originates a call to start the BCO test.

As explained above in detail the present invention enables a simple, easy and flexible test for the D-channel as well as the B-channel in the ISDN switching system.

We claim:

1. An ISDN switching system having testing facilities comprising:
    an ISDN exchange accommodating a plurality of lines on which ISDN signals each composed of B-channels and D-channels at least are transferred, and having connection paths formed therein between the incoming line and the outgoing line;
    testing means connected through said ISDN exchange for carrying out a test with respect to an object to be tested, which object exists along said line;
    converting means for directly connecting to said ISDN exchange through one of said lines by performing a signal format conversion from a D-signal format that does not match said ISDN signal to a B-signal format that matches said ISDN signal;
    change-over means, located between said object to be tested and said converting means, which is operative to apply a received D-channel signal selectively to said converting means or to a Link Access Procedure on a D-channel (LAPD) termination unit; and
    connecting means for forming said connection path in said ISDN exchange between the line connected to said converting means and the line connected to said object to be tested.

2. An ISDN switching system having testing facilities comprising:
    an ISDN exchange accommodating a plurality of lines on which ISDN signals each composed of B-channels and D-channels at least are transferred, and having connection paths formed therein between the incoming line and the outgoing line;
    testing means connected through said ISDN exchange for carrying out a test with respect to an object to be tested, which object exists along said line;
    converting means for directly connecting to said ISDN exchange through one of said lines by performing a signal format conversion from a signal format that does not match said ISDN signal to a signal format that matches said ISDO signal;
    change-over means located between said object to be tested and said converting means, the change-over means being operative to apply a received D-channel signal alternatively to said converting means or to a Link Access Procedure on a D-channel (LAPD) termination unit, selectively, said LAPD directing control signals received in said D-channel signal to said ISDN exchange; and
    connecting means for forming said connection path in said ISDN exchange between the line connected to said converting means and the line connected to said object to be tested.

3. A system as set forth in claim 2, wherein, when a D-channel test is to be carried out, said change-over means makes a path to apply said D-channel signal not to said LAPD termination unit but to said converting means, and the converting means is operative to convert the received D-channel signal into a signal having a B-channel signal format, and the thus converted D-channel signal is applied to said testing means through said ISDN exchange.

4. A system as set forth in claim 3, wherein said change-over means and said converting means are mounted in a Digital subscriber Line Circuit Controller (DLCC) which inherently includes therein said LAPD termination unit.

5. A system as set forth in claim 4, wherein said change-over means is comprised of both an upstream side transfer switch and a downstream side transfer switch, where the upstream and downstream side switches are connected to said converting means when a bit error measurement is to be carried out by said testing means through said ISDN exchange.

6. A system as set forth in claim 4, wherein said change-over means is comprised of a first selector having a first switch part used for applying a transmission signal from said LAPD termination unit to said converting means and a second switch part used for applying a reception signal from said converting means to said LAPD termination unit.

7. A system as set forth in claim 6, wherein, when a monitoring test is to be carried out by said testing means, said first selector operates such that said transmission signal from said LAPD termination unit as well as an upstream D-channel signal of the subscriber side are given to said converting means, while the upstream signal from the subscriber and the said transmission signal from said LAPD termination unit, both are returned, after the monitoring test, from said testing means and output from said converting means, and are given, respectively, to the reception side of the LAPD termination unit and to the subscriber side.

8. A system as set forth in claim 7, wherein said converting means is operative to receive both the transmission signal from said LAPD termination unit and the upstream D-channel signal from the subscriber side and convert the same into the signal having a B-channel signal format to apply the same to said converting means, while the signal, returned from said testing means through said ISDN exchange and output from the converting means, is divided into two D-channel signals for the subscriber side and the LAPD termination unit.

9. A system as set forth in claim 8, wherein said testing means includes a loopback unit to return the signal from said converting means, after the monitoring test, to the converting means through said ISDN exchange.

10. A system as set forth in claim 9, wherein, when a bit error measurement is to be carried out, a measuring equipment in said testing means generates a predetermined bit pattern,
    said DLCC is operative to release said LAPD termination unit, receive the bit pattern given through said ISDN exchange and convert the same from the B-channel signal format to the D-channel signal format by said converting means to send the same to the subscriber side,
    said DLCC is then operative to receive the thus sent D-channel signal sent to the subscriber side and returned thereto, convert the thus returned D-channel signal into the B-channel signal at said converting means and send the D-channel signal containing said bit pattern to said measuring equipment through said ISDN exchange to check matching between the sent bit pattern and the received bit pattern.

11. A system as set forth in claim 10, wherein said testing means includes a second selector used for switching a received signal to said loopback unit for the monitoring test or said measuring equipment, selectively.

12. A system as set forth in claim 10, wherein said testing means has a remote measuring equipment and an additional converting means mounted therein, the remote measuring equipment being connected to another line accommodated in the ISDN exchange, in which said bit pattern is communicated between the subscriber side and the remote measuring equipment through said additional converting means and the ISDN exchange.

13. A system as set forth in claim 10, wherein said testing means has a remote measuring equipment and an additional converting means mounted therein, the remote measuring equipment being connected to one of the lines accomodated in another, remote ISDN exchange, in which said bit pattern is communicated between the subscriber side and the remote measuring equipment through said additional converting means, the ISDN exchange, and said another, remote ISDN exchange, two digital trunks cooperating with these two ISDN exchanges and a relaying line being connected between the two digital trunks.

14. A system as set forth in claim 1, wherein said converting means includes a bit format converter.

15. An ISDN switching system having testing facilities comprising:
    an ISDN exchange accommodating a plurality of lines on which ISDN signals each composed of B-channels and D-channels at least are transferred, and having connection paths formed therein between the incoming line and the outgoing line;
    testing means connected through said ISDN exchange for carrying out a test with respect to an object to be tested, which object exists along said line;
    converting means for directly connecting to said ISDN exchange through one of said lines by performing a signal format conversion from a signal format that does not match said ISDN signal to a signal format that matches said ISDO signal, said converting means including a Digital subscriber Line Test Interface (DLTI) mounted in a subscriber test interface trunk, the DLTI being connected between one of said lines accommodated in said ISDN exchange and a test use terminal equipment which forms a part of said testing means, said DLTI having both an exchange interface and an S/T point interface to perform a signal format conversion between a highway data format and a (2B+D) channel data format;
    connecting means for forming said connection path in said ISDN exchange between the line connected to said converting means and the line connected to said object to be tested.

16. A system as set forth in claim 15, wherein a test line dropper is formed, as a part of said testing means, in a Digital subscriber Line & Trunk test Equipment (DLTE) to form a loopback through a corresponding Digital subscriber Line Circuit (DLC) to and from said ISDN exchange, which DLC is connected to said object to be tested so that a Bridge Cut-Off (BCO) test is achieved between said test use ISDN terminal equipment and other ISDN terminal equipment through said ISDN exchange.

17. A system as set forth in claim 16, wherein a Test Work Station (TWS) is employed to form a part of said testing means, and the TWS handles a test operation.

18. A system as set forth in claim 17, wherein said TWS is operative to make a test path in said ISDN exchange in cooperation with said connecting means with the aid of a Terminal Adapter (TADP) and an Analog Line test Trunk Interface (ALTI) both inherently mounted in said subscriber test interface trunk and a Push Button (PB) receiver.

19. A system as set forth in claim 18, wherein said TWS is operative to issue a subscriber telephone number of said object to be tested, receive status information, i.e., "idle", "busy" and "lockout", of said object and status information of said DLTE, i.e., "idle" and "busy", and subscriber class (analog or digital) information all given from said connecting means, so that the TWS starts making the connection path in the ISDN exchange, if the object and DLTE are both "idle", between said DLTE and said DLTI, through which connection path (2B+D+information (INF)) the channel signal is transferred.

20. A system as set forth in claim 17, wherein said test use ISDN terminal equipment and said TWS are disposed in a Central Maintenance Operation Center (CMOC), while said DLTE including said test line dropper is disposed in a local switch containing said ISDN exchange, in which said test use ISDN terminal equipment and said TWS are connected to said local switch through respective digital trunks and corresponding relaying lines.

* * * * *